US012639462B2

(12) United States Patent
Subramaniam et al.

(10) Patent No.: US 12,639,462 B2
(45) Date of Patent: May 26, 2026

(54) SIMPLIFIED DATA ACCESS AND MANAGEMENT FOR DATA COMPUTING

(71) Applicant: Microsoft Technology Licensing, LLC, Redmond, WA (US)

(72) Inventors: Venkata Subramaniam, Redmond, WA (US); Piyush Sharma, Uttar Pradesh (IN); Fnu Harkirat Singh, Happy Valley, OR (US); Ashis Kumar Roy, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 164 days.

(21) Appl. No.: 18/482,569

(22) Filed: Oct. 6, 2023

(65) Prior Publication Data

US 2025/0117507 A1    Apr. 10, 2025

(51) Int. Cl.
*G06F 21/62*        (2013.01)
*G06F 16/25*        (2019.01)
(Continued)

(52) U.S. Cl.
CPC ........ *G06F 21/6218* (2013.01); *G06F 16/258* (2019.01); *G06F 16/9566* (2019.01);
(Continued)

(58) Field of Classification Search
None
See application file for complete search history.

(56) References Cited

U.S. PATENT DOCUMENTS 7,210,125 B2 *  4/2007  Chang ................ G06F 9/44505
                                      707/999.103
7,840,699 B2 * 11/2010  Fujita ................ H04L 61/4511
                                      709/238
(Continued)

FOREIGN PATENT DOCUMENTS

WO      WO-2025012940 A1 *  1/2025  ........... H04L 67/567

OTHER PUBLICATIONS

Greenwald, et al., "Oracle Essentials: Oracle Database 11g", Fourth Edition, Nov. 11, 2007, 408 Pages.
(Continued)

*Primary Examiner* — Lashonda Jacobs-Burton
(74) *Attorney, Agent, or Firm* — Weaver IP L.L.C.

(57)        ABSTRACT

Systems, methods, devices, and computer readable storage media described herein provide techniques for simplifying data access and management for data computing. In an aspect, a request to load data is received. The request comprises an aliased name associated with the data. A call is transmitted to a name resolution service executing on a computing device. The call comprises the aliased name and is configured to cause the name resolution service to identify the data associated with the aliased name. A response is received from the first resolution service. The response comprises metadata of the data. The data is obtained from a data source based on the metadata. A dataset is generated based on the obtained data. A response to the request is provided. The response comprises the generated dataset. In a further aspect, an application is configured to import a library into a computer program under development.

20 Claims, 10 Drawing Sheets

300

302 Receive a request to load data, the request comprising an aliased name associated with the data 304 Transmit, to a first name resolution service executing on a computing device, a first call comprising the aliased name, the first call configured to cause the name resolution service to identify the data associated with the aliased name 306 Receive, from the first name resolution service, a response comprising metadata of the data 308 Obtain the data from a data source based on the metadata 310 Generate a dataset based on the obtained data 312 Provide a response to the request, the response comprising the generated dataset

(51) Int. Cl.

| | |
|---|---|
| *G06F 16/955* | (2019.01) |
| *H04L 67/02* | (2022.01) |
| *H04L 67/10* | (2022.01) |
| *H04L 61/4511* | (2022.01) |

(52) U.S. Cl.
CPC .............. *H04L 67/02* (2013.01); *H04L 67/10* (2013.01); *H04L 61/4511* (2022.05)

(56) References Cited

U.S. PATENT DOCUMENTS

| | | | | |
|---|---|---|---|---|
| 8,543,998 | B2 * | 9/2013 | Barringer ............ | G06F 11/3698 |
| | | | | 717/169 |
| 9,235,815 | B2 * | 1/2016 | O'Sullivan ............ | G06Q 10/00 |
| 10,223,261 | B2 * | 3/2019 | Baek ................... | G06F 12/1027 |
| 11,514,088 | B2 * | 11/2022 | Karlberg ............... | G06F 16/176 |
| 2002/0116370 | A1 * | 8/2002 | Harvey ............... | H04L 61/4517 |
| 2005/0015761 | A1 * | 1/2005 | Chang ................ | G06F 9/44505 |
| | | | | 717/174 |
| 2009/0037964 | A1 | 2/2009 | Murray | |
| 2009/0300604 | A1 * | 12/2009 | Barringer ............ | G06F 11/3698 |
| | | | | 717/178 |
| 2012/0203781 | A1 * | 8/2012 | Wakefield ........... | H04L 61/4523 |
| | | | | 707/736 |
| 2012/0324020 | A1 * | 12/2012 | O'Sullivan ........... | H04L 51/063 |
| | | | | 709/206 |
| 2014/0164642 | A1 * | 6/2014 | Dilmaghani ............ | H04L 45/08 |
| | | | | 709/238 |
| 2014/0164643 | A1 * | 6/2014 | Dilmaghani ........ | H04L 61/4553 |
| | | | | 709/238 |
| 2017/0366501 | A1 * | 12/2017 | Pandya ............... | H04L 61/4511 |
| 2019/0149511 | A1 * | 5/2019 | Dias ........................ | H04L 12/12 |
| | | | | 726/5 |
| 2022/0237213 | A1 * | 7/2022 | Karlberg ............ | G06F 16/1748 |
| 2022/0405308 | A1 * | 12/2022 | Buchmann ............ | H04L 67/561 |

OTHER PUBLICATIONS

International Search Report and Written Opinion received for PCT Application No. PCT/US2024/047912, Dec. 11, 2024, 13 pages.
International Preliminary Report on Patentability (Chapter I) received for PCT Application No. PCT/US2024/047912 mailed on Date Apr. 16, 2026, 08 Pages.

* cited by examiner

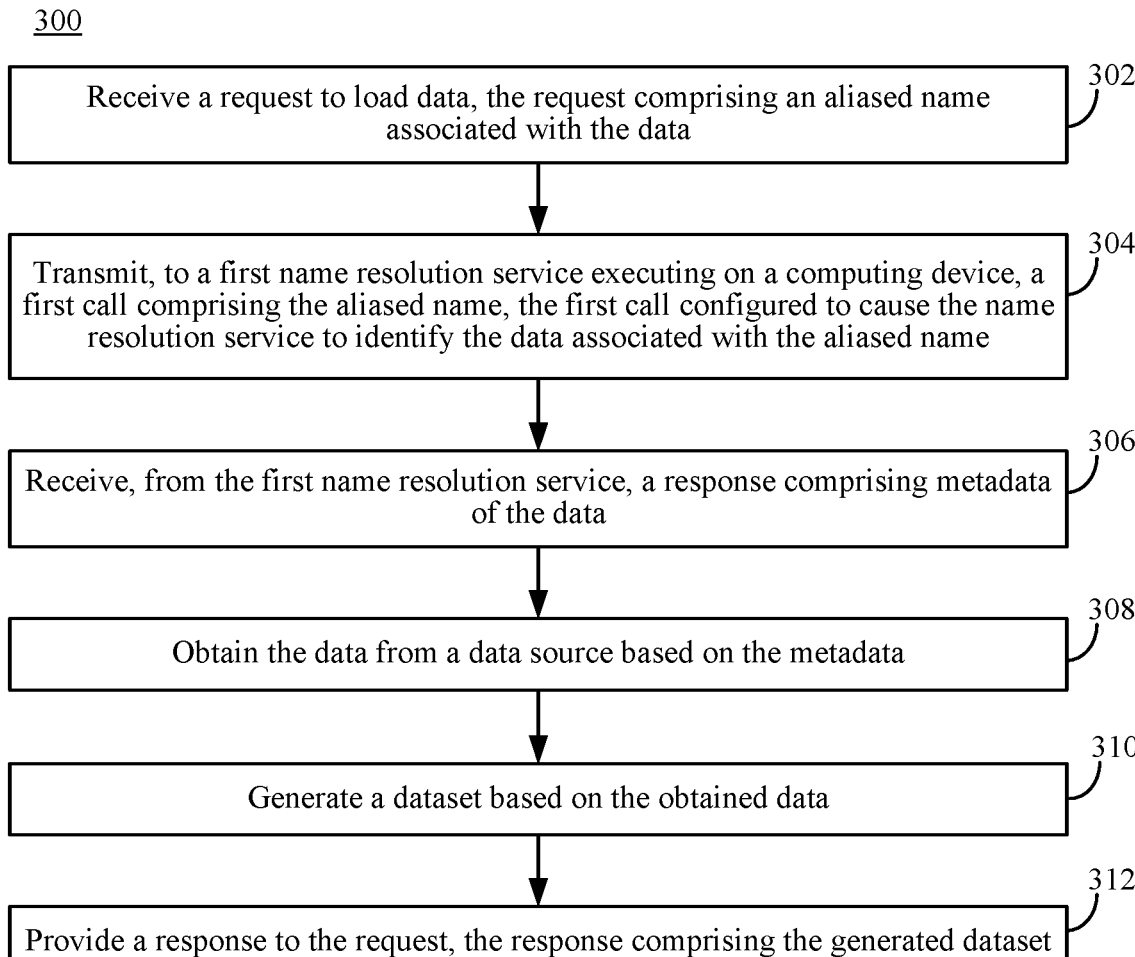

300

302
Receive a request to load data, the request comprising an aliased name associated with the data 304
Transmit, to a first name resolution service executing on a computing device, a first call comprising the aliased name, the first call configured to cause the name resolution service to identify the data associated with the aliased name 306
Receive, from the first name resolution service, a response comprising metadata of the data 308
Obtain the data from a data source based on the metadata 310
Generate a dataset based on the obtained data 312
Provide a response to the request, the response comprising the generated dataset

FIG. 3

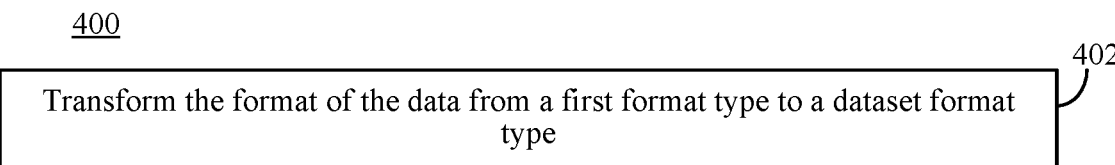

400

402
Transform the format of the data from a first format type to a dataset format type

| Transmit, to a plurality of name resolution services comprising the first name resolution service, respective calls comprising the aliased name | 502 |

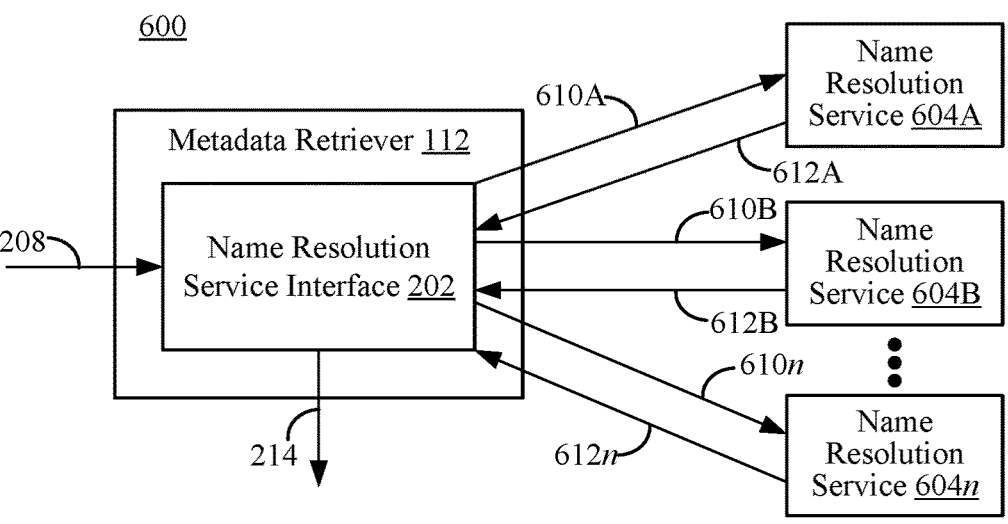

| Prior to transmitting the first call, transmit, to a second name resolution service of the plurality of name resolution services, a second call comprising the aliased name, the second call configured to cause the second name resolution service to attempt to identify the data associated with the aliased name | 702 |

| Receive, from the second name resolution service, a response indicating the second name resolution service failed to identify the data | 704 |

| Transmit, to the first name resolution service, the first call | 706 |

FIG. 7

800
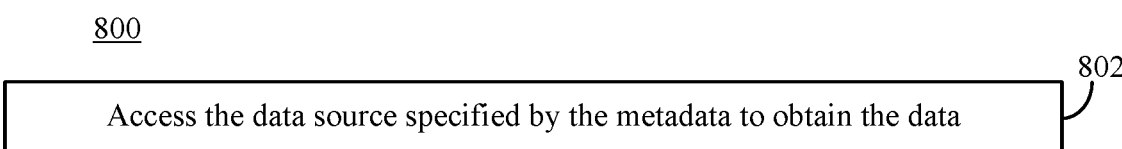
Access the data source specified by the metadata to obtain the data    802
FIG. 8
900
Determining to access the data source based on an analysis of respective loads of a plurality of data sources    902
FIG. 9
1000
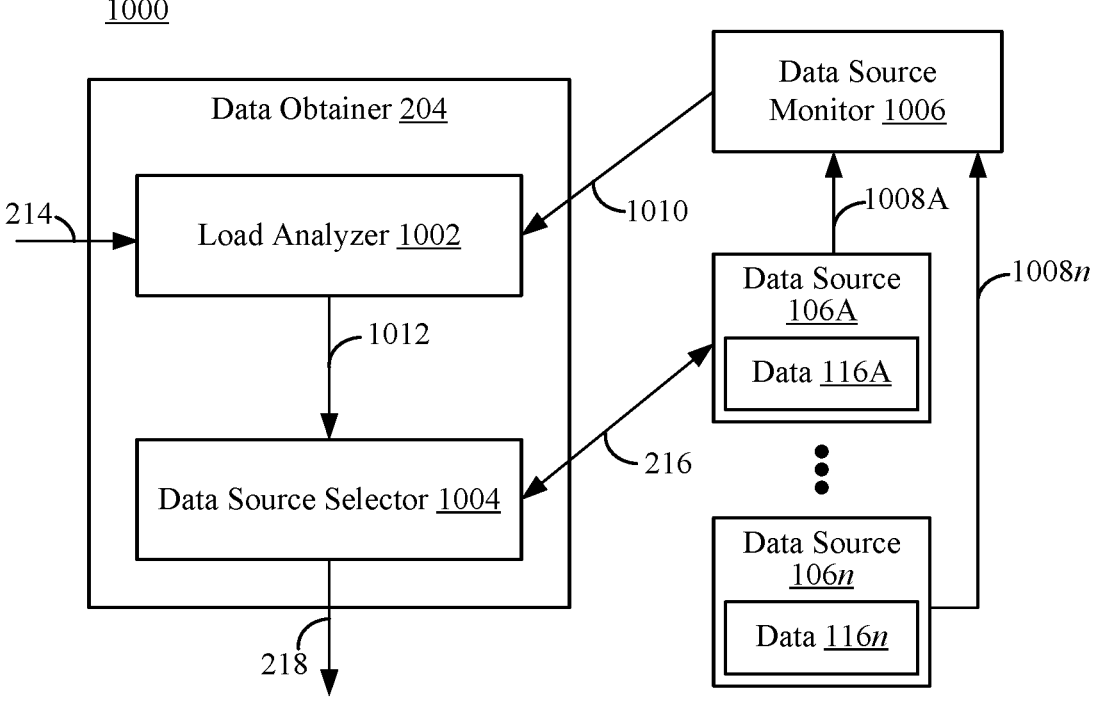
FIG. 10

1100

1200

1300

1400

1500

1600

1700

1800

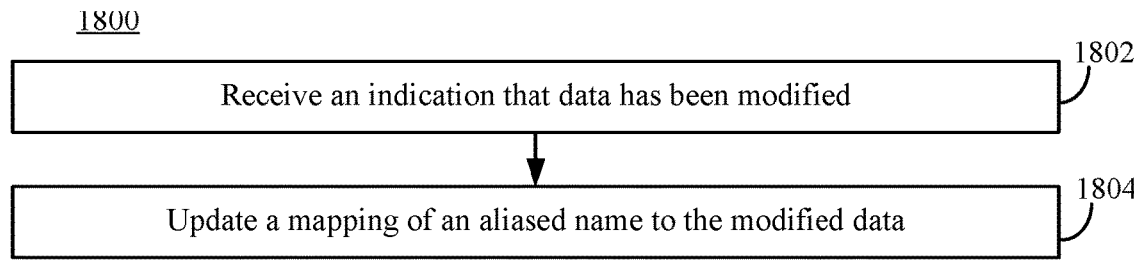

Receive an indication that data has been modified    1802

Update a mapping of an aliased name to the modified data    1804

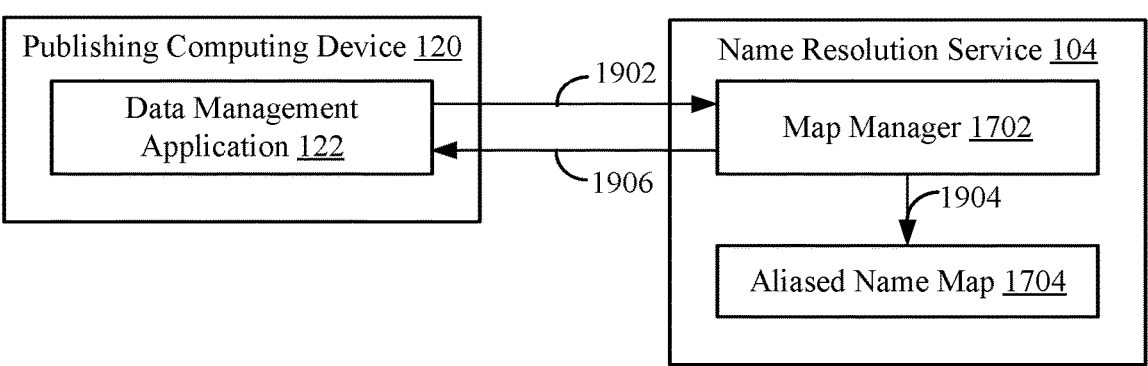

Publishing Computing Device 120

Data Management Application 122

1902

1906

Name Resolution Service 104

Map Manager 1702

1904

Aliased Name Map 1704

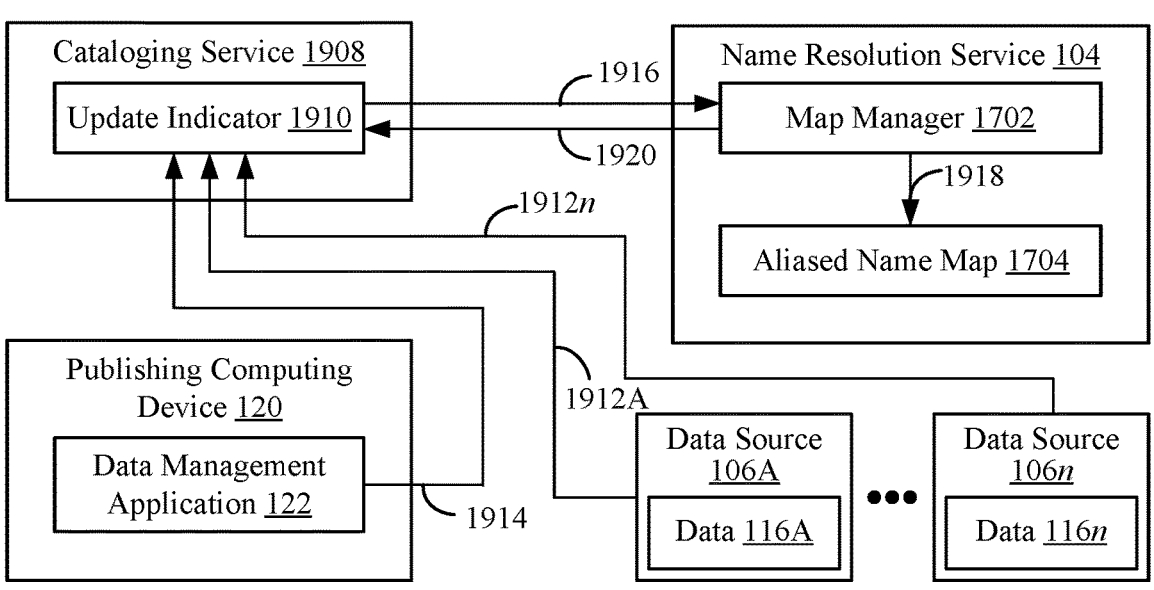

Cataloging Service 1908

Update Indicator 1910

1916

1920

1912n

Name Resolution Service 104

Map Manager 1702

1918

Aliased Name Map 1704

Publishing Computing Device 120

Data Management Application 122

1914

1912A

Data Source 106A

Data 116A

Data Source 106n

Data 116n

SIMPLIFIED DATA ACCESS AND MANAGEMENT FOR DATA COMPUTING

BACKGROUND

Data in a dataset may be accessed for various data computing operations (e.g., data analytics). A dataset may be stored, manipulated, and analyzed in various formats using a data processing operation implemented by a query. Various software tools exist that enable users and applications to perform data processing operations on datasets using code. Typically, the user or application needs to know where the data is stored, the format of the data, and credentials required to access the data. If the location, the format, or the required credentials of the data changes, the code that accesses the data needs to be changed as well.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for simplified data access and management. In an aspect, a request to load data is received. The request comprises an aliased name associated with the data. A first call is transmitted to a first name resolution service executing on a computing device. The first call is configured to cause the first name resolution service to identify the data associated with the aliased name. A response is received from the first name resolution service. The response comprises metadata of the data. The data is obtained from a data source based on the metadata. A dataset is generated based on the obtained data. A response to the request is provided. The response comprises the generated dataset.

In a further aspect, the metadata specifies the data source the data is stored in. The data source specified by the metadata is accessed to obtain the data.

In a further aspect, the metadata specifies a format of the data. The dataset is generated by transforming the format of the data from a first format type to a dataset format type.

In a further aspect, the metadata specifies a plurality of data sources that store the data, the plurality of data sources comprising the data source. A determination to access the data source is made based on an analysis of respective loads of the plurality of data sources.

In another aspect, an application is configured to import a library into a computer program under development (e.g., a notebook or a script). The library includes a metadata retriever and a dataset loader. Based on the importing, code of the library may be referenced within the computer program under development to cause the metadata retriever to transmit the first call to the first name resolution service and receive the response from the first name resolution service, and to cause the dataset loader to obtain the data from the data source and generate the dataset.

In another aspect, a name resolution service receives a call to identify data associated with an aliased name. The name resolution service identifies the data based on a mapping of the aliased name to the data. The name resolution service provides a response to the call, the response comprising metadata of the data.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 shows a flowchart of a process for providing simplified data access and management in data computing, in accordance with an example embodiment.

FIG. 4 shows a flowchart of a process for generating a dataset, in accordance with an example embodiment.

FIG. 5 shows a flowchart of a process for transmitting respective calls to a plurality of name resolution services, in accordance with an example embodiment.

FIG. 6 shows a block diagram of a system comprising a plurality of name resolution services, in accordance with an example embodiment.

FIG. 7 shows a flowchart of a process for sequentially transmitting respective calls to a plurality of name resolution services, in accordance with an example embodiment.

FIG. 8 shows a flowchart of a process for obtaining data, in accordance with an example embodiment.

FIG. 9 shows a flowchart of a process for utilizing load balancing techniques in data access operations, in accordance with an example embodiment.

FIG. 10 shows a block diagram of a system for utilizing load balancing techniques in data access operations, in accordance with an example embodiment.

FIG. 18 shows a flowchart of a process for updating a mapping of an aliased name to data, in accordance with an embodiment.

FIG. 19A shows a block diagram of a system for updating a mapping of an aliased name to data, in accordance with an embodiment.

FIG. 19B shows a block diagram of a system for updating a mapping of an aliased name to data, in accordance with another embodiment.

Figure 1:
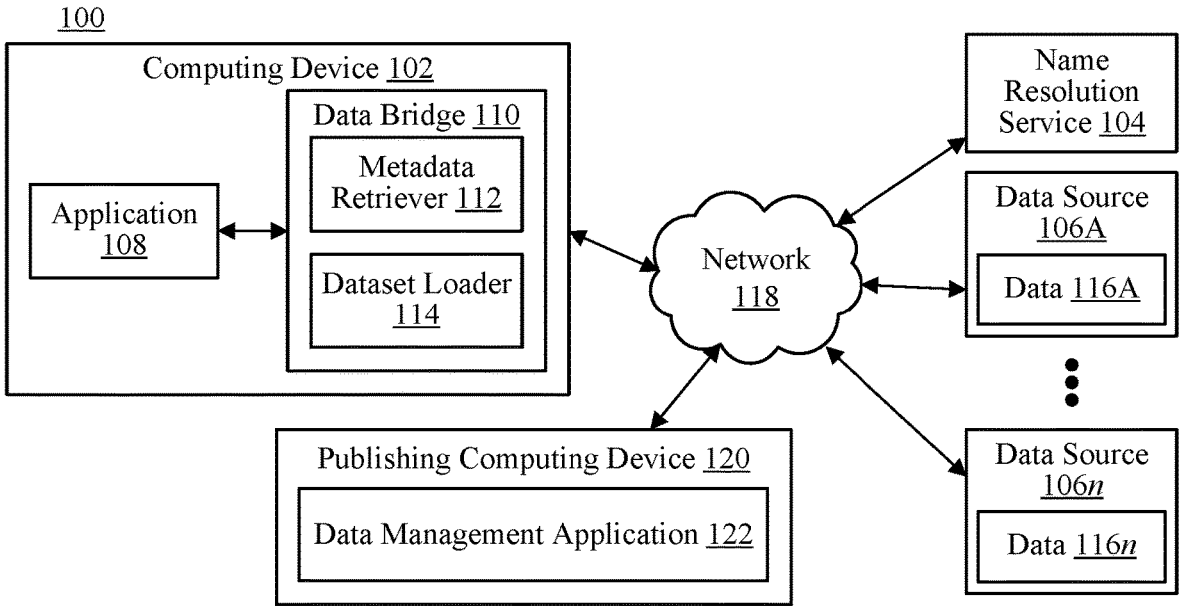
FIG. 1 shows a block diagram of a system for providing simplified data access and management in data computing, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Simplified Data Access and Management

Data may be accessed for various data computing operations (e.g., data analytics). Data may be stored, generated, and/or maintained by a publishing entity (e.g., an authoring user of the data (e.g., an individual user, a group of users, a family user, etc.), an organization that generates and/or maintains the data, an application that maintains the data (e.g., on behalf of a user or organization), and/or the like). A publishing entity may generate data, enable other entities (e.g., users, applications, organizations, etc.) to access the data, specify a data source (or a location within a data source) that stores and/or generates the data, move data stored in a location to a new location, transform the data from one format to another, copy the data to another location, implement an access policy with respect to the data (e.g., a policy that specifies credentials required to access the data), and/or perform any other operation related to the storage and/or maintenance of data. Entities that access the data (also referred to as "consumers" herein) may manipulate and/or analyze the data using data processing operations. Data processing operations may include, for example, relational algebra operations (selection, projection, join, aggregation, etc.), linear algebra operations (transpose, dot product, etc.) and various other operations (plotting, time series operations, etc.).

As described in the Background section, various software tools exist that enable users and applications to perform data processing operations on datasets using code (e.g., code in a notebook, code in a script (e.g., a Python® script), application code, etc.). However, these existing tools have performance and scalability limitations. For instance, these tools typically require a consumer to specify the location the data is stored in and/or where the data is generated, the format of the data, and the credentials required to access the data. As noted above, a publishing entity may transform data (e.g., to enhance performance and/or compatibility of their data processing system), move the data to a new location, implement an access policy, and/or otherwise modify the process of accessing the data in a manner that can impact consumer's ability to do so. If the access is impacted, a user is required to update code executed to perform the data processing operations.

Furthermore, existing load balancing and distribution techniques require the consumer to write code to implement the logic for selecting a location for accessing data. This can be complex and inefficient, as it adds extra overhead and complexity to the consumer's code. Moreover, the load balancing and load distribution depends on the consumer code and not the actual traffic conditions or data characteristics of the data processing system, which can lead to suboptimal or inconsistent results.

Embodiments of the present disclosure provide simplified data access and management. In one aspect, a system includes a data bridge that interfaces with a name resolution service to perform data access and management operations. In another aspect, a system enables importing a library (e.g., a Python library) into a computer program under development (e.g., a notebook or script). The library enables the user to utilize a name resolution service to perform data access and management operations. In either case, embodiments simplify data access and management by abstracting the complexity of connecting to different data sources and formats, enabling consumers to focus on their code logic and analysis, and improving load balancing techniques.

As noted above, embodiments described herein provide simplified data access and management by utilizing a name resolution service. For instance, a data bridge receives a request to load data. The request comprises an aliased name associated with the data. The data bridge transmits a call to a name resolution service. The call comprises the aliased name and is configured to cause the name resolution service to identify the data associated with the aliased name. The data bridge receives a response from the name resolution service, the response comprising metadata of the data. The metadata may specify one or more data sources the data (or copies of the data) is stored in and/or generated by, a format of the data, a requirement for a user credential to access the data, a type of user credential required to access the data, a non-aliased name of the data, and/or any other information that may be used for locating, accessing, and/or utilizing the data. The data bridge obtains the data from a data source based on the metadata and generates a dataset based on the obtained data. In accordance with an embodiment, the dataset is a distributed dataset. The dataset may comprise a labeled one-dimensional array (also referred to as a series), a labeled two-dimensional array (also referred to as a dataframe), or any other data structure used to organize data. The data bridge provides a response to the request, the response comprising the generated dataset. In this manner, the data bridge provides a unified interface for accessing data from different data sources and formats.

As noted above, the data bridge interfaces with a name resolution service that identifies the data associated with an aliased name. In this context, an "aliased name" is a name that (e.g., uniquely) identifies data. In a further aspect, the aliased name is configured to be used by a consumer without the consumer needing to know the details of the data or where it is stored. The name resolution service (or a publishing entity interacting with the name resolution service)

maps aliased names to corresponding data (and respective metadata). In accordance with an embodiment, the name resolution service (or the publishing entity) maps the aliased names to corresponding "feed source configurations." A feed source configuration comprises metadata of the data. Feed source configurations may be stored in a feed source configuration file. A feed source configuration file specifies the data source, the file type, and/or any other metadata or other details for a data source and/or data generated by and/or stored in the data source. A feed source configuration file may include multiple entries for different data sources (e.g., different data sources with unique names and/or sets of parameters.

By leveraging a name resolution service to identify data, embodiments described herein decouple a consumer's code from data configuration, thereby enabling the consumer to access the data without needing to know where the data is stored, the format of the data, the credentials required to access the data, or other metadata of the data. Furthermore, a publishing entity is able to update, move, or otherwise modify the data with little or no impact on the consumer's code configured to access the data. This reduces the compute resources required to update code used to access data by reducing or eliminating a consumer's need to update code in response to a publishing entity updating, moving, or otherwise modifying the data. Furthermore, by decoupling the consumer's code from the data configuration, a consumer's code is less likely to fail to access data if the publishing entity modifies the data. Moreover, by abstracting the metadata about the data from the consumer's code, embodiments of data bridges enable high availability for networked systems (e.g., cloud network systems, enterprise network systems, etc.) in the event a location where the data is stored is unreachable (e.g., due to network traffic, due to use by another computing system, due to the location undergoing maintenance, and/or the like).

Data bridges and name resolution services may provide simplified data access and management in various ways, in embodiments. For instance, FIG. 1 shows a block diagram of a system 100 for providing simplified data access and management in data computing, in accordance with an example embodiment. As shown in FIG. 1, system 100 comprises a computing device 102, a name resolution service 104, one or more data sources 106A-106n, and a publishing computing device 120. Computing device 102, name resolution service 104, data sources 106A-106n, and publishing computing device 120 are communicatively coupled via network 118. Network 118 may comprise one or more networks such as local area networks (LANs), wide area networks (WANs), enterprise networks, the Internet, etc., and may include one or more of wired and/or wireless portions. The features of system 100 are described in detail as follows.

Computing device 102 may be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In accordance with an embodiment, computing device 102 is associated with a user (e.g., an individual user, a group of users, an organization, a family user, a customer user, an employee user, an admin user (e.g., a service team user, a developer user, a management user, etc.), etc.). Computing device 102 is configured to execute application 108 and data bridge 110. As shown in FIG. 1, data bridge 110 is external to application 108. Alternatively, application 108 may include logic to perform some or all of the functions of data bridge 110. In embodiments, application 108 and/or the user associated with computing device 102 are entities that access data, or "consumers."

Application 108 comprises an application configured to utilize data bridge 110 to access data (e.g., for analysis thereof). For example, application 108 may be an application for developing and/or executing computer programs. Application 108 may send a request, to data bridge 110, to load data. A request may be for a particular set of data or for multiple sets of data. In any case, the request includes an aliased name for each requested data.

Data bridge 110 is configured to generate a dataset for data requested by application 108. Data bridge 110 may be a service executed by computing device 102 or implemented by application 108. Optionally, logic for performing some or all of the functions of data bridge 110 may be imported into a computer program (e.g., as a library), as further described with respect to FIGS. 14 and 15, as well as elsewhere herein. As shown in FIG. 1, data bridge 110 includes a metadata retriever 112 and a dataset loader 114. Metadata retriever 112 comprises logic for receiving requests to load data, utilizing one or more name resolution services to obtain metadata, transmitting a call to a name resolution service (e.g., a call comprising an aliased name included in a received request, the call configured to cause the name resolution service to identify the data associated with the aliased name), transmitting respective calls to a plurality of name resolution services (e.g., as further described with respect to FIGS. 5-7, as well as elsewhere herein), receiving one or more responses from respective name resolution services (e.g., responses comprising metadata), selecting a name resolution service to transmit a call to, and/or performing other functions associated with retrieving metadata and/or interfacing with a name resolution service, as described elsewhere herein. In accordance with an embodiment, metadata retriever 112 includes an interface for communicating with name resolution service 104 via network 118.

Dataset loader 114 comprises logic for obtaining data from a data source based on metadata (e.g., by accessing a data source, as further described with respect to FIGS. 8-11 and 13, as well as elsewhere herein), generating a dataset based on the obtained data (e.g., by loading data into a dataset (e.g., a dataframe), by transforming the format of the data, as further described with respect to FIG. 4, as well as elsewhere herein), providing responses including a generated dataset, utilizing load balancing techniques (e.g., as further described with respect to FIGS. 9 and 10, as well as elsewhere herein), receiving and/or obtaining user credentials (e.g., as further described with respect to FIGS. 11-13), and/or performing other functions associated with obtaining data and loading it into a dataset, as described elsewhere herein. In accordance with an embodiment, dataset loader 114 includes an interface for communicating with data sources 116A-116n via network 118.

Name resolution service 104 is configured to identify data based on a mapping of an aliased name to the data. In accordance with an embodiment, name resolution service 104 is a table or map that stores a mapping of aliased names to respective data (and associated metadata). In this context, data bridge 110 or a managing service of the table or map of name resolution service 104 identifies the data (and associated metadata) based on a mapping of the aliased name to the data. In accordance with another embodiment, name resolution service 104 is an application programming interface (API) or a content delivery network (CDN) that, when called by data bridge 110, identifies the data (and associated metadata) based on a mapping of the aliased name to the data. In accordance with a further embodiment, the mapping of the aliased name to the data (and associated metadata) is stored in a feed source configuration file accessible to name resolution service 104. As shown in FIG. 1, name resolution service 104 is external to computing device 102. In an alternative embodiment, computing device 102 is configured to execute logic to perform some or all of the functions of name resolution service 104. For instance, some or all of such logic may be included in application 108 or data bridge 110. Additional details regarding name resolution service 104 are described with respect to FIGS. 2, 3, 5-7, and 16-21, as well as elsewhere herein.

Data sources 106A-106n are configured to store and/or generate data. Examples of data sources 106A-106n include, but are not limited to, data stores, databases (e.g., blob storages, structured query language (SQL) databases, etc.), file systems (e.g., local file systems, distributed file systems, etc.), cloud-based storage services (e.g., cloud-based data lake storages, cloud-based databases, cloud-based file systems, etc.), streaming platforms (e.g., platforms that generate and/or provide data in real time), and/or any other system and/or service that stores and/or generates data. In accordance with an embodiment, any of data sources 106A-106n may be implemented as a web service. As shown in FIG. 1, data sources 106A-106n are configured to generate and/or store respective data 116A-116n. Data 116A-116n comprise files and/or streamed data. Example formats of data 116A-116n include, but are not limited to, a tab separated file format, a comma separated file format, a column storage format (e.g., Apache parquet), a stream format (e.g., a structured stream format), a JavaScript object notation (JSON) format, and/or any other format of data that may be generated and/or stored by a data source described herein, or as would be understood by a person ordinarily skilled in the relevant art(s) having benefit of this disclosure. Data 116A-116n may be different types of files and/or streams of data. Alternatively, two or more of data 116A-116n are copies of the same file of data or streams of the same data.

Publishing computing device 120 may be any type of stationary or mobile processing device. In accordance with an embodiment, publishing computing device 120 is associated with a publishing entity. Publishing computing device 120 is configured to execute data management application 122. A publishing entity may interact with data management application 122 (e.g., via a user interface of publishing computing device 120, not shown in FIG. 1 for brevity) to maintain, generate (e.g., utilizing data management application 122 and/or a data source of data sources 106A-106n), and/or store data (e.g., in a data source of data sources 106A-106n). For example, suppose, with respect to FIG. 1, the publishing entity of publishing computing device 120 is the publisher of data 116A-116n. In this context, the publishing entity may interact with data management application 122 to generate data 116A-116n, manage a stream of a streaming data source of data sources 106A-106n (e.g., to start streaming data, to stop streaming data, to modify the streaming of data, etc.), enable other entities (e.g., consumers, such as the consumer of computing device 102) to access data 116A-116n, specify a location (e.g., a data source of data source 106A-106n, a file path of a data source of data source 106A-106n, a folder within data source of data source 106A-106n, etc.) where data of data 116A-116n is to be stored, move data stored in a location to a new location (e.g., move data 116A from data source 106A to data source 106n, move data 116A from a first location within data source 106A to a second location within data source 106A, and/or the like), transform data of data 116A-116n from one format to another, copy data of data 116A-116n to another location (e.g., copy data 116A and store the copy in data source 106n), implement an access policy with respect to data of data 116A-116n (e.g., a policy that specifies credentials required to access any or all of data 116A-116n), update a mapping of an aliased name to data of data 116A-116n managed by name resolution service 104, cause name resolution service 104 to update a mapping of an aliased name to data of data 116A-116n, and/or perform any other operation related to the storage, generation, and/or maintenance of data 116A-116n. Additional details regarding publishing computing device 120 are described with respect to FIGS. 18-19B, as well as elsewhere herein.

Figure 2:
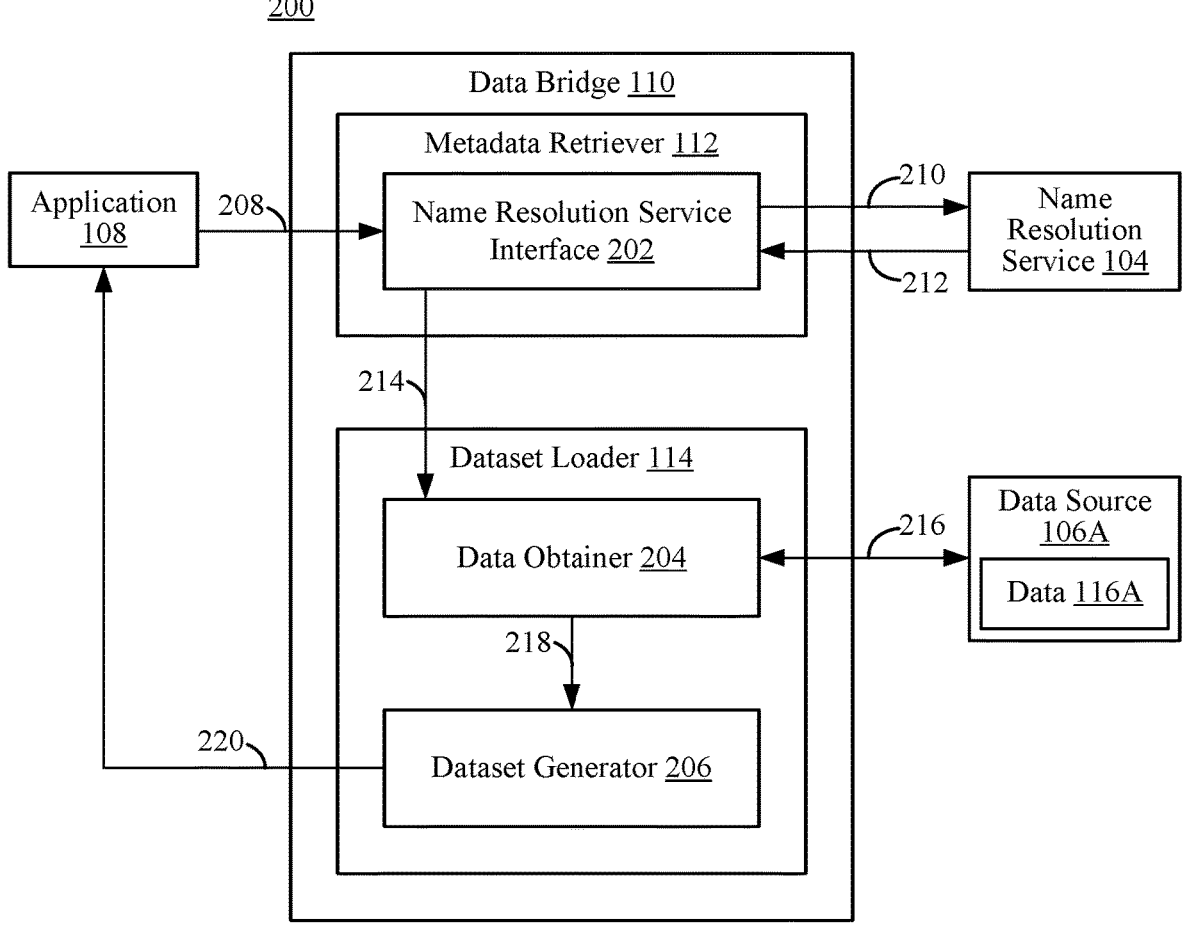
FIG. 2 shows a block diagram of a system for providing simplified data access and management in data computing, in accordance with another example embodiment.

Data bridge 110 may be configured to generate a dataset for requested data in various ways, in embodiments. For example, FIG. 2 shows a block diagram of a system 200 for providing simplified data access and management in data computing, in accordance with another example embodiment. As shown in FIG. 2, system 200 comprises name resolution service 104, data source 106A, application 108, and data bridge 110 (comprising metadata retriever 112 and dataset loader 114), as respectively described with respect to FIG. 1. As also shown in FIG. 2, metadata retriever 112 comprises a name resolution service interface 202 and dataset loader 114 comprises a data obtainer 204 and a dataset generator 206. To better illustrate embodiments for generating datasets, system 200 is described with respect to FIG. 3. FIG. 3 shows a flowchart 300 of a process for providing simplified data access and management in data computing, in accordance with an example embodiment. Data bridge 110 of FIG. 2 may operate according to flowchart 300 in embodiments. Not all steps of flowchart 300 need be performed in all embodiments. Further structural and operational embodiments will be apparent to persons skilled in the relevant art(s) based on the following description of FIGS. 2 and 3.

Flowchart 300 begins with step 302. In step 302, a request to load data is received. The request comprises an aliased name associated with the data. For example, name resolution service interface 202 of FIG. 2 receives a request 208 from application 108. Request 208 comprises an aliased name associated with the data. In accordance with an embodiment, request 208 specifies a name resolution service to use to identify the data (e.g., name resolution service 104). As a non-limiting running example, suppose data 116A is associated with an aliased name "ALIAS116." In this context, a consumer (e.g., via interaction with a user interface of application 108) transmits request 208 to load ALIAS116. In accordance with an embodiment, request 208 is an API call referencing ALIAS116.

In step 304, a first call comprising the aliased name is transmitted to a first name resolution service executing on a computing device. The first call is configured to cause the name resolution service to identify the data associated with the aliased name. For example, name resolution service interface 202 of FIG. 2 transmits a call 210 to name resolution service 104. As discussed elsewhere herein, name resolution service 104 may execute on computing device 102 (i.e., the same computing device comprising data bridge 110) or a computing device other than computing device 102. Call 210 comprises the aliased name received in request 208 (as described with respect to step 302) and is configured to cause name resolution service 104 to identify data associated with the aliased name. For instance, with respect to the running example described with respect to step 302, call 210 comprises ALIAS116 and is configured to cause name resolution service 104 to identify data associated with ALIAS116 (e.g., data 116A). In accordance with an embodiment, call 210 is an API call. In accordance with a further embodiment, call 210 is (e.g., a subset of) an API call included in request 208.

In accordance with an embodiment, name resolution service interface 202 is preconfigured to transmit calls to identify data to name resolution service 104. Alternatively, name resolution service interface 202 is configured during a setup process (e.g., when data bridge 110 is loaded by computing device 102, as specified in a line of code executed by an application (e.g., application 108) of computing device 102, etc.) to transmit calls to identify data to name resolution service 104. In accordance with another alternative embodiment, request 208 specifies name resolution service 104 is to be used to identify data. In another alternative, name resolution service interface 202 selects name resolution service 104 from a plurality of name resolution services to transmit request 208 to (e.g., randomly, based on a sequence, based on a load of one or more name resolution services, etc.). Additional details regarding utilizing multiple name resolution services are described with respect to FIGS. 5 and 6, as well as elsewhere herein.

In step 306, a response comprising metadata of the data is received from the first name resolution service. For example, name resolution service interface 202 of FIG. 2 receives a response 212 from name resolution service 104. Response 212 comprises metadata of data identified by name resolution service 104. For instance, with respect to the running example described with steps 302 and 304, response 212 comprises metadata of data 116A. In accordance with a further embodiment, and as described with respect to FIGS. 9 and 10 as well as elsewhere herein, response 212 includes metadata for multiple instances (e.g., copies) of identified data. As shown in FIG. 2, name resolution service interface 202 provides the metadata included in response 212 as a metadata signal 214 to data obtainer 204 and flowchart 300 proceeds to step 308.

In step 308, data is obtained from a data source based on the metadata. For example, data obtainer 204 of FIG. 2 obtains data 116A from data source 106A based on metadata included in metadata signal 214. As shown in FIG. 2, data obtainer 204 obtains data 116A over a connection 216 (e.g., a network connection, a direct connection, etc.) with data source 106A. In accordance with an embodiment, and as described further with respect to FIG. 8, data obtainer 204 accesses data source 106A to obtain data 116A. For instance, data obtainer 204 may query data source 106A for data 116A. Alternatively, data obtainer transmits a request to a managing service of data source 106A (not shown in FIG. 2) for data 116A. As shown in FIG. 2, data obtainer 204 provides the obtained data (e.g., data 116A) to dataset generator 206 as obtained data 218 and flowchart 300 continues to step 310.

In step 310, a dataset is generated based on the obtained data. For example, dataset generator 206 generates a dataset based on obtained data 218. In accordance with an embodiment, and as further described with respect to FIG. 4 as well as elsewhere herein, dataset generator 206 generates the dataset by transforming obtained data 218 from a first format to a second format. For instance, dataset generator 206 in accordance with an embodiment loads obtained data 218 into a dataframe. Alternatively, obtained data 218 is preconfigured (e.g., stored or generated) as a dataset consumable by the consumer.

In step 312, a response to the request is provided, the response comprising the generated dataset. For example, dataset generator 206 provides a response 220 comprising the dataset generated in step 310 to application 108. In accordance with an embodiment, response 220 causes application 108 to utilize the generated dataset to perform a data processing operation. Alternatively, or additionally, response 220 causes application 108 to display the generated dataset in a user interface (e.g., a user interface of application 108 or another user interface of computing device 102).

In accordance with an alternative embodiment, dataset generator 206 provides response 220 to a compute engine (e.g., a data processing engine) configured to execute data processing operations, not shown in FIG. 2 for brevity. In this context, the compute engine executes a data processing operation utilizing the generated dataset. In a further embodiment of this alternative, the compute engine provides a response to application 108 comprising the result of the executed data processing operation. In accordance with an embodiment, the compute engine comprises data bridge 110. Alternatively, the compute engine is a subcomponent of data bridge 110 (e.g., a subcomponent of dataset loader 114, a subcomponent of dataset generator 206, a separate subcomponent of data bridge 110). In another alternative, the compute engine is a separate component or service of computing device 102 or another computing device communicatively coupled to computing device 102.

Embodiments of dataset generators may be configured to generate datasets in various ways. For example, dataset generator 206 of FIG. 2 may transform data obtained from a data source from a first format to a second format. Dataset generator 206 may operate to transform data in various ways, in embodiments. FIG. 4 shows a flowchart 400 of a process for generating a dataset, in accordance with an example embodiment. Flowchart 400 is a further example of step 310 of flowchart 300 as described with respect to FIG. 3. Dataset generator 206 may operate according to flowchart 400 in an embodiment. Note flowchart 400 need not be performed in all embodiments. Further structural and operational embodiments will be apparent to persons skilled in the relevant art(s) based on the following description of FIG. 4 with respect to FIG. 2.

Flowchart 400 includes step 402. In step 402, the format of the data is transformed from a first format type to a dataset format type. For example, dataset generator 206 of FIG. 2 transforms obtained data 218 from a first format type to a dataset format type. In accordance with an embodiment, dataset generator 206 comprises logic to convert obtained data 218 to the dataset format type. In an alternative embodiment, dataset generator 206 utilizes (e.g., by calling an API of) an external converting engine that converts obtained data 218 to the dataset format type. In accordance with an embodiment, the dataset format type is predetermined based on a configuration of data bridge 110. Alternatively, request 208 specifies the dataset format type obtained data 218 is to be transformed to.

As a non-limiting example, and with reference to the running example described with respect to flowchart 300 of FIG. 3. Suppose data 116A is stored in a JSON format and dataset generator 206 is configured to provide dataframes in response to requests to load data. In this context, dataset generator 206 transforms data 116A (i.e., obtained data 118) from the JSON format to a dataframe format. A dataframe represents a distributed collection of data organized into named columns. The dataframe may be manipulated using database queries (e.g., SQL queries), APIs, and/or other data processing operations. For instance, the dataframe can be converted into another format type (e.g., another data structure type (e.g., a resilient distributed dataset (RDD) type), and/or any other format type described elsewhere herein or as would be understood by a person ordinarily skilled in the relevant art(s) having benefit of this disclosure). In a further example, dataset generator 206 converts the dataframe to another format type (e.g., based on a format type requested in request 208).

Thus, example embodiments of transforming data obtained from a data source have been described with respect to FIGS. 2 and 4. By transforming obtained data in this manner, dataset generator 206 enables data to be stored in a variety of formats (e.g., any format) and provided in a unified format to a requesting consumer. For instance, suppose the publishing entity of data 116A opts to transform data 116A from a first format (e.g., a JSON format) to a second format (e.g., Apache Parquet). Publishing entities may decide to change the format of data due to changes in data technologies, to enable the use of certain data processing features (e.g., atomicity, consistency, isolation, and durability (ACID) transactions, schema evolution, time travel, etc.), and/or any other reason a publishing entity may desire changing a format of data. These changes may modify a file type of data 116A, a compression codec of data 116A, a partitioning scheme of data 116A, and/or any other formatting feature of data 116A. As discussed herein, embodiments decouple the logical name of data from its physical format, enabling a consumer to request data to be loaded by referring to an aliased name (e.g., requesting data 116A to be loaded by referring to ALIAS116, as in the running example described with respect to flowchart 300 of FIG. 3) (e.g., without having to refer to the format or a format feature of the data).

Furthermore, by decoupling the aliased name of data from the format of the data, embodiments enable a publishing entity to change format features of the data without affecting a consumer's ability to access the data by referring to the aliased name (e.g., without the consumer having to modify code). This simplifies and streamlines data access and management for both publishing entities and consumers.

Moreover, by decoupling the aliased name of data from the format of the data and converting the data to a dataset format, embodiments of dataset generators (such as dataset generator 206 of FIG. 2) enable a consumer to request data stored or generated in any format without the consumer having to specify (or even knowing) the format of the data. This improves interoperability of the stored or generated data, enabling any (e.g., authorized) consumer to access data. Furthermore, the decoupling provides flexibility and portability to a consumer's code, thereby enabling a consumer to switch between (e.g., migrate to) different environments or platforms (e.g., code development platforms, code processing platforms) with reduced modification to their code.

III. Example Embodiments for Utilizing Multiple Name Resolution Services

As described herein, name resolution service interface 202 of FIG. 2 utilizes a name resolution service to identify data based on an aliased name included in a request to load data. For instance, as described with respect to FIGS. 2 and 3, name resolution service interface 202 transmits a call to name resolution service 104 (e.g., based on a pre-configuration of data bridge 110, based on a setup process of data bridge 110, based on a received request, etc.). Furthermore, name resolution service interface 202 may utilize multiple name resolution services in attempts to identify data based on an aliased name. Name resolution service interface 202 may simultaneously use multiple name resolution services, sequentially use multiple name resolution services, or conditionally use multiple name resolution services (e.g., if one or more name resolution services fail to identify data).

Name resolution service interface 202 may operate in various ways to utilize multiple name resolution services in attempts to identify data, in embodiments. For example, FIG. 5 shows a flowchart 500 of a process for transmitting respective calls to a plurality of name resolution services, in accordance with an example embodiment. Flowchart 500 is a further embodiment of step 304 of flowchart 300 as described with respect to FIG. 3. Name resolution service interface 202 may operate according to flowchart 500, in an embodiment. For purposes of illustration, flowchart 500 of FIG. 5 is described with respect to FIG. 6. FIG. 6 shows a block diagram of a system 600 comprising a plurality of name resolution services, in accordance with an example embodiment. As shown in FIG. 6, system 600 includes metadata retriever 112 as described with respect to FIG. 1 (and including name resolution service interface 202, as described with respect to FIG. 2), a name resolution service 604A, a name resolution service 604B, and a name resolution service 604n (collectively, "name resolution services 604A-604n"). Name resolution services 604A-604n are examples of name resolution service 104 as described with respect to FIG. 1. Flowchart 500 and system 600 are described as follows. Note that flowchart 500 need not be performed in all embodiments. Further structural and operational embodiments will be apparent to persons skilled in the relevant art(s) based on the following description of FIGS. 5 and 6.

Flowchart 500 includes step 502. In step 502, respective calls are transmitted to a plurality of name resolution services comprising the first name resolution service. The calls each comprise the aliased name. For example, name resolution service interface 202 of FIG. 6 transmits a first call 610A to name resolution service 604, a second call 610B to name resolution service 604B, and a nth call 610n to name resolution service 604n. Each of calls 610A-610n comprise the aliased name included in request 208 (e.g., ALIAS116) and are configured to cause the respective name resolution service of name resolution services 604A-604n to (e.g., attempt to) identify data based on the aliased name.

As also shown in FIG. 6, name resolution service interface 202 is configured to receive respective responses 612A, 612B, and 612n from name resolution service 604A, name resolution service 604B, and name resolution service 604n. In accordance with an embodiment, each of responses 612A-612n comprise metadata of data identified by respective revolution services 604A-604n. Alternatively, one or more of responses 612A-612n include an indication the respective name resolution service failed to identify data associated with the aliased name. Name resolution service interface 202 may include any of the metadata included in responses 612A-612n in metadata signal 214 provided to data obtainer 204 of FIG. 2.

In accordance with an embodiment, name resolution service interface 202 transmits calls 610A-610n simultaneously. Alternatively, name resolution service interface 202 transmits calls 610A-610n sequentially. For example, name resolution service interface 202 may load calls 610A-610n in a queue and calls are transmitted from the queue sequentially. In another example where calls are transmitted sequentially, name resolution service interface 202 transmits call 610A to name resolution service 604A and transmits the next call (e.g., call 610B) subsequent to receiving a response to call 610A (e.g., response 612A).

In accordance with an embodiment, name resolution service interface 202 is preconfigured to transmit calls to identify (or attempt to identify) data to name resolution services 604A-604n. Alternatively, data bridge 110 is configured during a setup process to transmit calls to identify data to name resolution services 604A-604n. In accordance with another alternative embodiment, request 208 specifies name resolution services 604A-604n are to be used to identify data.

As described with respect to FIGS. 5 and 6, name resolution service interface 202 may transmit respective calls to a plurality of name resolution services. In some embodiments, name resolution service interface 202 transmits calls to respective name resolution services sequentially. For instance, if a name resolution service fails to identify data, name resolution service interface 202 in accordance with an embodiment transmits a call to another name resolution service. Name resolution service interface 202 may operate to sequentially transmit calls in various ways, in embodiments. FIG. 7 shows a flowchart 700 of a process for sequentially transmitting respective calls to a plurality of name resolution services, in accordance with an example embodiment. Name resolution service interface 202 may operate according to flowchart 700 in an embodiment. Note that not all steps of flowchart 700 need to be performed in all embodiments. Further structural and operational embodiments will be apparent to persons skilled in the relevant art(s) based on the following description of FIG. 7 with respect to FIG. 6.

Flowchart 700 begins with step 702. In step 702, prior to transmitting the first call, a second call comprising the aliased name is transmitted to a second name resolution service of the plurality of name resolution services. The second call is configured to cause the second name resolution service to attempt to identify the data associated with the aliased name. For example, suppose name resolution service interface 202 of FIG. 6 transmits call 610A to name resolution service 604A prior to transmitting call 610B to name resolution service 604B. In this context, call 610A comprises the aliased name included in request 208 and is configured to cause name resolution service 604A to attempt to identify data associated with the aliased name.

In step 704, a response is received from the second name resolution service. The response indicates the second name resolution service failed to identify the data. For example, suppose name resolution service 604A fails to identify data and name resolution service interface 202 of FIG. 6 receives a response 612A from name resolution service 604A. In this context, response 612A indicates name resolution service 604A failed to identify data associated with the aliased name included in call 610A. Name resolution service 604A may fail to identify the data due to a fault in the operation of name resolution service 604A, fail to identify the data because a mapping of aliased names to data managed by name resolution service 604A does not include the aliased name, fail to identify the data because the mapping of aliased names to data managed by name resolution service 604A is out of date, and/or otherwise fail an attempt to identify data associated with the aliased name.

In step 706, the first call is transmitted to the first name resolution service. For example, name resolution service interface 202 of FIG. 6 transmits a call 610B to name resolution service 604B. In this context, call 610B comprises the aliased name included in request 208 and is configured to cause name resolution service 604B to attempt to identify data associated with the aliased name. If name resolution service 604B is able to identify data associated with the aliased name, flow continues in a similar manner described with respect to steps 306-312 of flowchart 300 of FIG. 3.

If name resolution service 604B is unable to identify data associated with the aliased name, name resolution service interface 202 may receive an indication of the failure from name resolution service 604B in a similar manner as described with respect to step 704 and name resolution service 604A. In this context, name resolution service interface 202 transmits another call to another name resolution service (e.g., name resolution service 604n or another name resolution service of system 600, not shown in FIG. 6 for brevity) to attempt to identify data associated with the aliased name. Name resolution service interface 202 in this context is configured to continue (e.g., sequentially) calling name resolution services until metadata is received (e.g., as described with respect to step 306 of flowchart 300 of FIG. 3) or until each name resolution service has indicated it failed to identify the data. If each name resolution service fails to identify the data, name resolution service interface 202 in accordance with a further embodiment is configured to return an error message in response to the request to load data (e.g., request 208). The error message may include an indication that the requested data was not located, that there may be an error in the aliased name (e.g., an incorrect aliased name, a misspelled aliased name, etc.), the name resolution services (or identifiers thereof) utilized to attempt to identify the data, an identifier of request 208, and/or any other information related to the attempt(s) to identify the data and the received request. In accordance with an embodiment, the error message is displayed in a user interface of application 108 of FIG. 1.

IV. Example Embodiments for Accessing Data

Embodiments of data bridges are configured to obtain data from a data source. For example, as described with respect to FIGS. 2 and 3, data bridge 110 comprises dataset loader 114, which comprises data obtainer 204 configured to obtain data from data source 106A (or another data source that stores and/or generates data) based on metadata retrieved from a name resolution service (e.g., name resolution service 104 of FIG. 2). Data obtainer 204 may operate to obtain the data in various ways, in embodiments. For instance, data obtainer 204 may obtain data based on metadata received from a name resolution service, based on respective loads of one or more data sources, utilizing credentials (e.g., credentials provided by a consumer, credentials obtained from a credential service, etc.), and/or as otherwise described elsewhere herein.

As noted above, data obtainer 204 of FIG. 2 may obtain data from a data source based on metadata (e.g., metadata received in response 212, as described with respect to FIG. 2 and step 306 of flowchart 300 of FIG. 3). For example, FIG. 8 shows a flowchart 800 of a process for obtaining data, in accordance with an example embodiment. Flowchart 800 is a further embodiment of step 308 of flowchart 300 of FIG. 3. Data obtainer 204 may operate according to flowchart 800 in an embodiment. Note that flowchart 800 need not be performed in all embodiments. Further structural and operational embodiments will be apparent to persons skilled in the relevant art(s) based on the following description of FIG. 8 with respect to FIG. 2.

Flowchart 800 includes step 802. In step 802, the data source specified by metadata is accessed to obtain the data. For instance, suppose the metadata included in response 212 received by name resolution service interface 202 (e.g., as described with respect to step 306 of flowchart 300 of FIG.

3) specifies data 116A is stored in and/or generated by data source 106A. In embodiments, the metadata may specify a location of data source 106A (e.g., via a uniform resource locator (URL) of data source 106A), a location of data 116A (e.g., via a URL of data 116A), a type of data source of data source 106A, an identifier of data source 106A (e.g., a uniform resource identifier (URI) of data source 106A), an identifier of data 116A (e.g., a URI of data 116A), and/or any other information that may be used to specify or otherwise locate a data source that stores data 116A. In this example, and with reference to step 802, data obtainer 204 of FIG. 2 obtains data 116A by accessing data source 116A based on the metadata specifying that data source 116A stores and/or generates data 116A. By enabling a data bridge to access a data source in this manner, embodiments described herein enable the data bridge to access data stored in and/or generated by any data source that computing device 102 is coupled to (e.g., via network 118); thereby improving the scalability and/or interoperability of database systems computing device 102 interfaces with, as the consumer access the variety of data sources by (e.g., only) specifying (e.g., in the original request (e.g., request 208)) the aliased name of the data (e.g., without having to specify the data source that stores and/or generates the data).

Furthermore, by enabling a data bridge to access a data source based on metadata provided by a name resolution service, embodiments described herein enable a publishing entity to migrate data from one database system (e.g., a relational database system (e.g., a SQL server)) to another database system (e.g., a distributed object storage system (e.g., Azure Storage)) with little or no impact to the consumer's code. A publishing entity may wish to migrate data from one data source to another for a variety reasons, such as, but not limited to, reducing operational costs, increasing availability, scaling storage capacity, and/or any other reason a publishing entity may choose to migrate data from one data source to another. In this context, the publishing entity (e.g., manually) updates mappings of the data maintained by name resolution service 104 to reflect the new data source. Alternatively, name resolution service 104 automatically updates to reflect the new data source. In either scenario, data obtainer 204 is able to access the correct data source based on the metadata received from name resolution service 104 (e.g., without requiring the consumer to provide location details (e.g., a connection string, a file format, a schema) to data bridge 110. Instead, the new location details are included in the metadata received by metadata retriever 112 in response to providing the aliased name to name resolution service 104 (e.g., in call 210). In this manner, embodiments described herein reduce the possibility of errors in obtaining data, reduce delays in accessing data (e.g., such as a delay caused by a consumer providing an incorrect or outdated location details and having to rectify the error), and/or increase consistency in data access.

As noted with respect to FIG. 8, data obtainer 204 of FIG. 2 may be configured to obtain data based on metadata that specifies where the data is stored and/or generated (e.g., by specifying a data source). It is also contemplated herein that metadata may specify multiple locations where respective copies of data are stored and/or generated. For instance, suppose a publishing entity in accordance with an embodiment intends to implement a load distribution technique that allocates copies of data or resources among multiple servers or locations (i.e., separate data sources). In this context, name resolution service 104 may identify each location where the data is stored and/or generated and provide metadata specifying each location (or, alternatively, respective metadata corresponding to each location) to name resolution service interface 202 (e.g., as metadata included in response 212. Data obtainer 204 may operate to utilize load balancing techniques to select which location to access to obtain the data.

Data obtainer 204 may operate to utilize load balancing techniques in various ways, in embodiments. For example, FIG. 9 shows a flowchart 900 of a process for utilizing load balancing techniques in data access operations, in accordance with an example embodiment. Flowchart 900 is a further embodiment of step 802 of flowchart 800 of FIG. 8. Data obtainer 204 may operate according to flowchart 900 in an embodiment. For purposes of illustration, flowchart 900 is described with respect to FIG. 10. FIG. 10 shows a block diagram of a system 1000 for utilizing load balancing techniques in data access operations, in accordance with an example embodiment. As shown in FIG. 10, system 1000 comprises data obtainer 204 and data sources 106A-106n as described with respect to FIGS. 1 and 2 and a data source monitor 1006. Data source monitor 1006 is configured to monitor changes to data stored and/or generated by data sources 106A-106n. Though only one data source monitor is shown in FIG. 10, a system may include multiple data source monitors each configured to monitor one or more data sources of data sources 106A-106n. As also shown in FIG. 10, data obtainer 204 comprises a load analyzer 1002 and a data source selector 1004. Alternatively, load analyzer 1002 is external to data obtainer 204 (e.g., as a subservice of data source monitor 1006, a subservice of another service or as a stand-alone load analyzing service). Note that flowchart 900 need not be performed in all embodiments. Further structural and operational embodiments will be apparent to persons skilled in the relevant art(s) based on the following description of FIGS. 9 and 10.

Flowchart 900 comprises step 902. In step 902, a determination to access the data source is made based on an analysis of respective loads of a plurality of data sources. For example, load analyzer 1002 of FIG. 10 receives a load signal 1010 from data source monitor 1006. Load signal 1010 comprises usage data and/or results of an analysis of usage data for a plurality of data sources of data sources 106A-106n (e.g., all of data sources 106A-106n or a subset of data sources 106A-106n). Load analyzer 1002 analyzes the data and/or results included in load signal 1010 and provides an analysis result 1012 to data source selector 1004. For instance, load analyzer 1002 may analyze the data and/or results to determine how often a particular data source is accessed in a period of time, how many applications and/or devices are accessing the particular data source, a latency of the data source's response to requests for data, a limit in the number of requests the data source can process within a period of time, a speed of a network used to access the data source, a capacity of a queue of requests for data of the data source, and/or any other data and/or information regarding the data source, usage of the data source, and/or a load of the data source. Analysis result 1012 in accordance with an embodiment includes an indication of a level of load for data sources of data sources 106A-106n. Data source selector 1004 determines which data source to access based on analysis result 1012. For instance, as shown in FIG. 10, data source selector 1004 determines to access data source 106A based on analysis result 1012.

As described with respect to step 902, load analyzer 1002 receives a load signal 1010 from data source monitor 1006. Data source monitor 1006 may generate load signal 1010 in various ways. For instance, as shown in FIG. 10, data source monitor 1006 receives usage data 1008A from data source 106A and usage data 1008*n* from data source 106*n* (and any other corresponding usage data from other data sources not shown in FIG. 10 for brevity). Depending on the implementation data source monitor 1006 passes usage data 1008A-1008*n* to load analyzer 1002 in load signal 1010. Alternatively, data source monitor 1006 performs a first analysis on usage data 1008A-1008*n* and provides the results to load analyzer 1002 in load signal 1010. The first analysis results indicate a level of load for one or more of data sources of data sources 106A-106*n*.

In accordance with an embodiment, load analyzer 1002 automatically receives load signal 1010 from data source monitor 1006. Alternatively, load analyzer transmits a request (not shown in FIG. 10) to data source monitor 1006 for usage data (or an analysis thereof) for two or more data sources of data sources 106A-106*n*. In accordance with an embodiment, the request is a request for usage data of all data sources monitored by data source monitor 1006. Alternatively, the request is a request for usage data of a subset of data sources monitored by data source monitor 1006. For instance, suppose metadata signal 214 specifies copies of the requested data are stored in and/or generated by data source 106A (e.g., as data 116A) and data source 106*n* (e.g., as data 116*n*). In this context, load analyzer 1002 transmits a request for usage data of data source 106A and data source 106*n*. In response to the request, data source monitor 1006 provides usage data (or analysis of the usage data) for the requested data sources in load signal 1010.

By determining to access a data source based on an analysis of respective loads of a plurality of data sources, load analyzer 1002 and data source selector 1004 provide load balancing techniques (which distribute traffic to and from data sources 106A-106*n*) to improve performance and availability of data, thereby reducing the latency in providing a response to a request to load data. Furthermore, load analyzer 1002 and data source selector 1004 provide the load balancing techniques in a manner that decouples the techniques from the consumer's code, enabling the consumer to implement simpler code without maintaining the overhead of load balancing. Further still, load analyzer 1002 and data source selector 1004 implement load balancing techniques that rely on metadata received from name resolution service 104 and output of data source monitor 1006, thereby enabling load analyzer 1002 and data source selector 1004 to select a data source based on an analysis of actual (or near actual) traffic conditions and data characteristics. Moreover, by implementing load balancing techniques, load analyzer 1002 and data source selector 1004 improve the scalability of systems that utilize data bridges. For instance, as more users utilize a data processing system, the overall traffic in the data processing system increases. The load balancing techniques of load analyzer 1002 and data selector 1004 described with respect to FIGS. 9 and 10 (as well as elsewhere herein) enable a consumer to leverage data distributed across multiple locations, potentially reducing traffic to a particular data source, and thereby reducing the latency in generating datasets.

FIGS. 9 and 10 have been described with respect to load balancing techniques implemented by a data bridge. It is also contemplated herein that load balancing techniques may be implemented by other components of system 1000 (or other systems described herein). For instance, data source monitor 1006 in accordance with an alternative embodiment comprises logic to perform the functions of load analyzer 1002. In this context, data obtainer 204 (or another component thereof, e.g., data source selector 1004) receives load analysis data from data source monitor 1006 and selects a data source based on the received load analysis data. In a further aspect, data obtainer 204 (or data selector 1004) queries data source monitor 1006 for load analysis data for the data sources that store and/or generate the requested data (e.g., data sources 106A-106*n*). In accordance with another alternative embodiment, and as described further with respect to FIGS. 20 and 21 as well as elsewhere herein, name resolution services (such as name resolution service 104) implement load balancing techniques.

Figure 11:
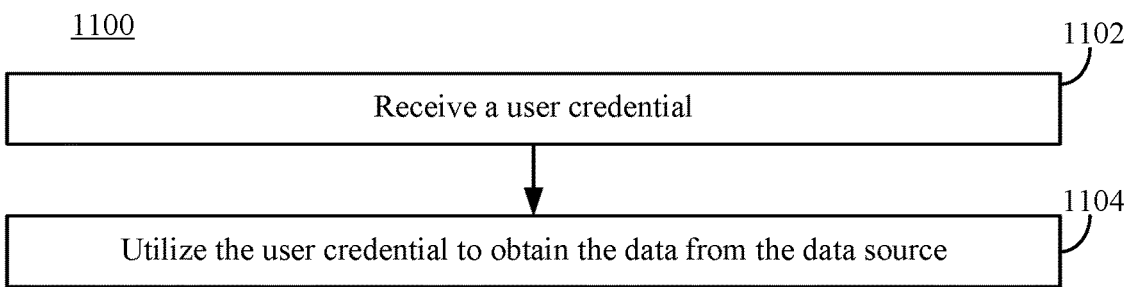
FIG. 11 shows a flowchart of a process for accessing data utilizing a user credential, in accordance with an example embodiment.

As noted above, data obtainer 204 of FIG. 2 may obtain data from a data source utilizing user credentials. For example, suppose a publishing entity specifies a policy that requires a consumer to present credentials to access data. In this context, data obtainer 204 utilizes the credentials to access data. Data obtainer 204 may operate to access data utilizing a user credential in various ways, in embodiments. For example, FIG. 11 shows a flowchart 1100 of a process for accessing data utilizing a user credential, in accordance with an example embodiment. Data obtainer 204 may operate according to flowchart 1100 in an embodiment. Note that not all steps of flowchart 1100 need to be performed in all embodiments. Further structural and operational embodiments will be apparent to persons skilled in the relevant art(s) based on the following description of FIG. 11 with respect to FIG. 2.

Flowchart 1100 begins with step 1102. In step 1102, a user credential is received. For example, data bridge 110 of FIG. 2 receives a user credential. In accordance with an embodiment, the user credential is included in request 208. Alternatively, data bridge 110 receives the user credential in a previous communication from application 108 (e.g., when configuring data bridge 110). In another alternative embodiment, and as further described with respect to FIGS. 12 and 13 as well as elsewhere herein, data bridge 110 receives the user credential from a credential service configured to maintain the user credential. In accordance with another embodiment, data bridge 110 transmits a credential request (not shown in FIG. 2) to application 108 based on metadata received from name resolution service 104 (e.g., a request for credentials specified in the metadata received in step 212 (e.g., based on the metadata specifying a policy that protects the data)). In this context, data bridge 110 receives the credentials from application 108 in response to the credential request.

Flowchart 1100 continues to step 1104, which may be a further embodiment of step 308 of flowchart 300 as described with respect to FIG. 3. In step 1104, the user credential is utilized to obtain the data from the data source. For example, data obtainer 204 of FIG. 2 utilizes the credential received in step 1102 to obtain data 116A from data source 106A. For instance, suppose data 116A is protected by a policy that requires the consumer to present credentials to access data 116A. In this context, the credential received in step 1102 satisfies the policy. Thus, embodiments of data bridges such as data bridge 110 enable a consumer to access data protected by policies requiring user credentials to access data.

Figure 12:
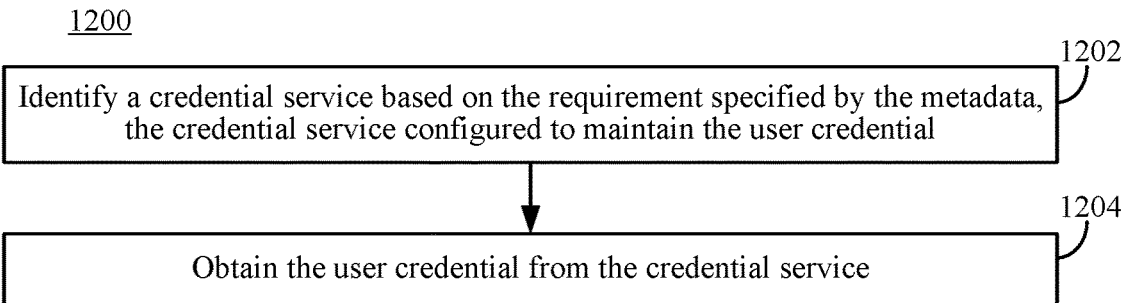
FIG. 12 shows a flowchart of a process for obtaining a user credential from a credential service, in accordance with an example embodiment.
Figure 13:
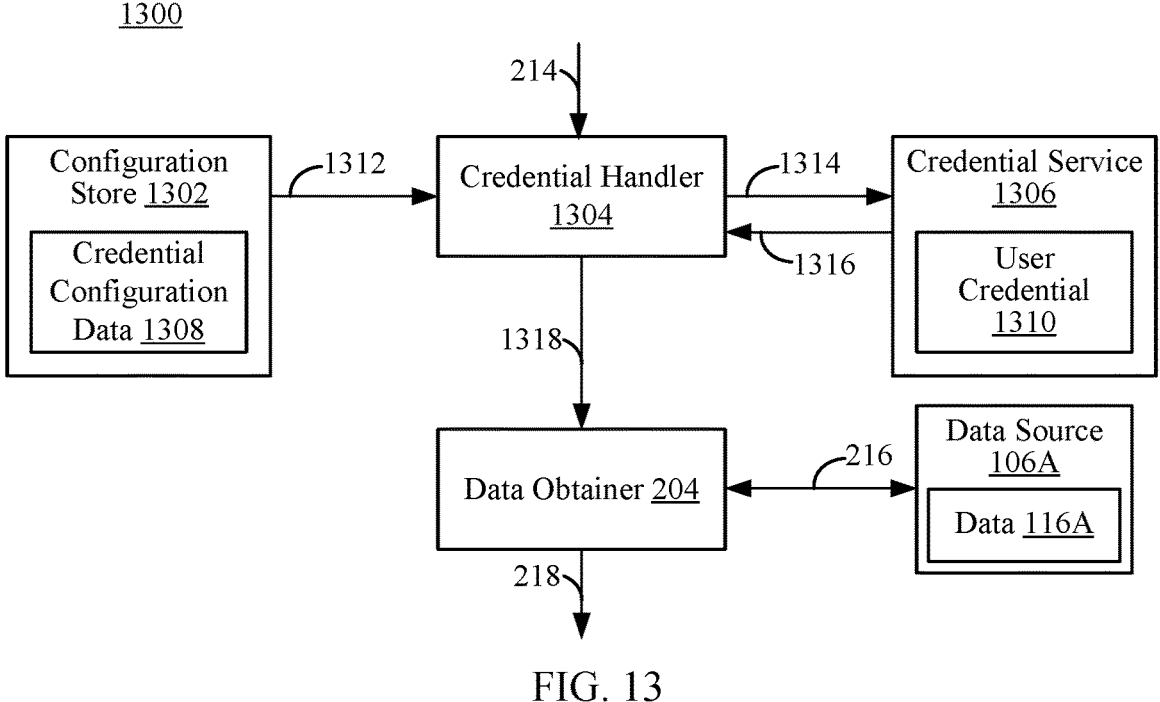
FIG. 13 shows a block diagram of a system for obtaining a user credential and accessing data using the user credential, in accordance with an example embodiment.

As noted with respect to FIG. 11, data obtainer 204 of FIG. 2 may be configured to obtain data from a data source utilizing user credentials. Furthermore, data obtainer 204 may be configured to obtain (or otherwise receive) user credentials in various ways, in embodiments. For example, FIG. 12 shows a flowchart 1200 of a process for obtaining a user credential from a credential service, in accordance with an example embodiment. Flowchart 1200 is a further embodiment of step 1102 of flowchart 1100 of FIG. 11. In accordance with an embodiment, dataset loader 114 and/or data obtainer 204 are configured to operate according to flowchart 1200. For purposes of illustration, flowchart 1200 is described with respect to FIG. 13. FIG. 13 shows a block diagram of a system 1300 for obtaining a user credential and accessing data using the user credential, in accordance with an example embodiment. As shown in FIG. 13, system 1300 comprises data source 106A (storing data 116A) and data obtainer 204 as respectively described with respect to FIGS. 1 and 2, a configuration store 1302, a credential handler 1304, and a credential service 1306. Credential handler 1304 in accordance with an embodiment is a sub-service of dataset loader 114 and/or data bridge 110 of FIG. 1. Configuration store 1302 may be any type of storage (e.g., a memory device) accessible to credential handler 1304 (e.g., a memory device of computing device 102, a memory device external to computing device 102, etc.). As shown in FIG. 13, configuration store 1302 stores credential configuration data 1308. Credential configuration data 1308 includes information such as, but not limited to, a connection type to access data, an identifier of a consumer (e.g., an identifier that uniquely identifies application 108 of FIG. 1 (i.e., an "application ID"), an identifier that uniquely identifies a user associated with computing device 102 (i.e., a "user ID"), and/or the like), a reference to a credential maintained by credential service 1306, and/or any other information that may be used by credential handler 1304 in obtaining a credential, as described further herein with respect to FIGS. 12 and 13. Credential service 1306 is a service that securely stores credentials (e.g., user credential 1310). In accordance with an embodiment, credential service 1306 is a key vault. Examples of credentials stored by credential service 1306 include, but are not limited to, keys (e.g., cryptographic keys (e.g., encryption keys, decryption keys, signing keys, key pairs, etc.)), passwords, authentication tokens, certificates, secrets, and/or any other sensitive information a consumer may deem private. Note that not all steps of flowchart 1200 need to be performed in all embodiments. Further structural and operational embodiments will be apparent to persons skilled in the relevant art(s) based on the following description of FIGS. 12 and 13.

Flowchart 1200 begins with step 1202. In step 1202, a credential service is identified based on the requirement specified by the metadata. The credential service is configured to maintain the user credential. For example, credential handler 1304 receives metadata signal 214 comprising the metadata received from name resolution service 104 (e.g., as described with respect to step 306 of flowchart 300 of FIG. 3). In this example, the metadata specifies a requirement for a user credential that satisfies a particular policy (e.g., a user credential associated with a policy, a user credential corresponding to a particular credential service, and/or any other user credential suitable for accessing data 116A). Credential handler 1304 also receives credential data 1312 from configuration store 1302. Credential data 1312 comprises information that may be used by credential handler 1304 in obtaining the required credential. In accordance with an embodiment, credential data 1312 is stored within credential configuration data 1308. In this context, credential handler 1304 obtains credential data 1312 by accessing credential configuration data 1308 and based on the requirement specified by the metadata of metadata signal 214. Credential handler 1304 identifies credential service 1306 based on credential data 1312.

To better illustrate embodiments for identifying a credential service, step 1202 and FIG. 13 are described with respect to a non-limiting example. In this non-limiting example, suppose the metadata included in metadata signal 214 speci-fies a consumer's credential for an account of the service that controls access to data source 106A is required to access data 116A. In this context, credential handler 1304 accesses credential configuration data 1308 associated with the consumer to obtain credential data 1312 that comprises information that may be used by credential handler 1304 in obtaining the credential for the account. Credential handler 1304 identifies credential service 1306 based on credential data 1312. For instance, credential data 1312 may specify an identifier or location of credential service 1306 and indicate that credential service 1306 maintains the credential of the account (e.g., user credential 1310).

In step 1204, the user credential is obtained from the credential service. For example, credential handler 1304 of FIG. 13 obtains user credential 1310 from credential service 1306. As shown in FIG. 13, credential handler 1304 transmits a credential request 1314 to credential service 1306. Credential request 1314 in accordance with an embodiment includes information that, when presented to credential service 1306, causes credential service 1306 to release user credential 1310 to credential handler 1304 in response 1316. For instance, credential request 1314 may include an identifier of the consumer, an identifier of application 108, and/or the like. In accordance with an embodiment, response 1316 includes an encrypted version of user credential 1310. In this context, the encrypted version of user credential 1310 is encrypted in a manner that (e.g., only) data source 106A (or the service that controls access to data source 106A) is able to decrypt the encrypted version and verify user credential 1310. By providing an encrypted version of user credential 1310, credential service 1306 improves security by preventing the decrypted version of user credential 1310 from being exposed to credential handler 1304. Moreover, by utilizing credential configuration data 1308 and metadata received from a name resolution service, credential handler 1304 is able to selectively obtain credentials and utilize the credentials to obtain data without requiring a consumer to specify the credentials in a request to load data, thereby simplifying the consumer's code.

As further shown in FIG. 13, credential handler 1304 provides user credential 1310 to data obtainer 204 as information 1318. Information 1318 also includes any other information included in 214, such as the metadata received from name resolution service 104. Data obtainer 204 utilizes user credential 1310 (and any other information (e.g., metadata) included in information 1318) to obtain data 116A from data source 106A, as described elsewhere herein.

While FIGS. 11-13 have been described with respect to user credentials, it is also contemplated herein that embodiments of credential handlers and data obtainers may obtain and utilize, respectively, other credentials required for accessing data (e.g., organization credentials, application credentials, and/or other credentials that are not necessarily assigned to (or available to) a user). For instance, if a consumer of data is an application, a policy that protects access to data 116A may specify an application credential (also referred to as a "service credential") the consumer is required to present in order to access data 116A.

V. Example Simplified Data Access and Management Library Embodiments

Figure 14:
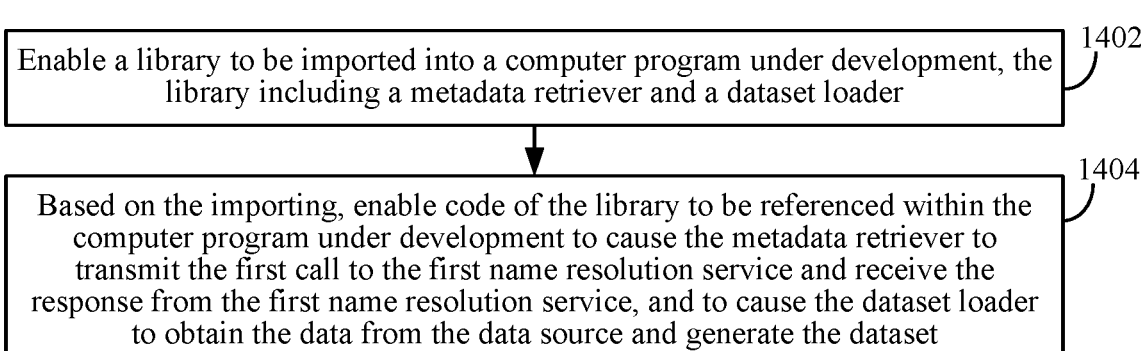
FIG. 14 shows a flowchart of a process for enabling simplified data access and management in data computing, in accordance with an embodiment.
Figure 15:
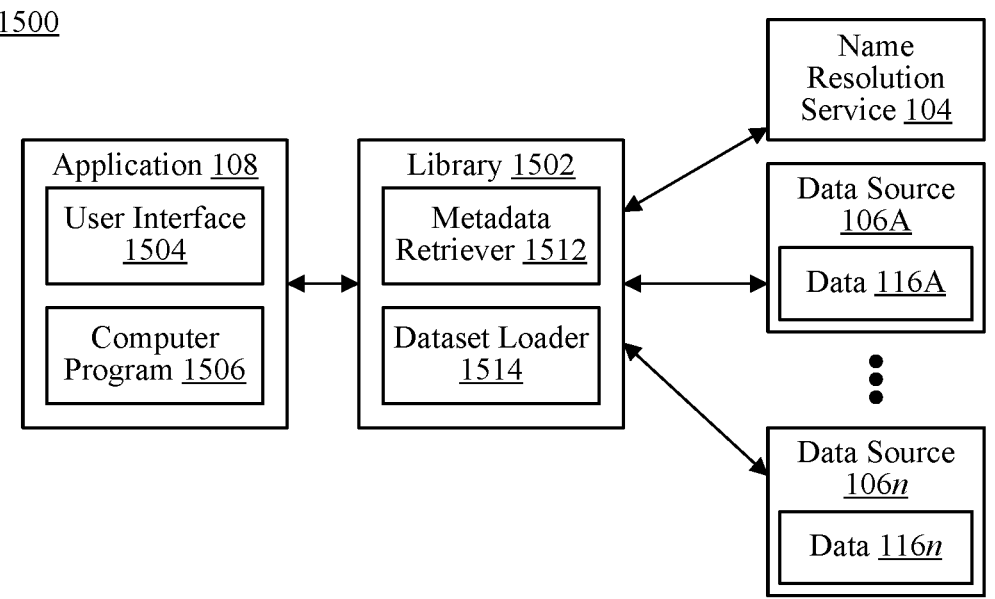
FIG. 15 shows a block diagram of a system for enabling simplified data access and management in data computing, in accordance with an embodiment.

As described herein, any of the components or subcomponents of data bridge 110 as described with respect to FIG. 1 may be implemented as logic and/or operations (e.g., code) included in a library (e.g., a Python library) that may be imported into a computer program (e.g., a computer program under development). For example, FIG. 14 shows a flowchart 1400 of a process for enabling simplified data access and management in data computing, in accordance with an embodiment. In an embodiment, computing device 102 of FIG. 1 or a subcomponent thereof may operate to perform one or all of the steps of flowchart 1400. For purposes of illustration, flowchart 1400 is described below with respect to FIG. 15. FIG. 15 shows a block diagram of a system 1500 for enabling simplified data access and management in data computing, in accordance with an embodiment. As shown in FIG. 15, system 1500 includes application 108, name resolution service 104, and data sources 106A-106*n*, as described with respect to FIG. 1 above, and library 1502. In FIG. 15, application 108 includes a user interface 1504 and computer program 1506, and library 1502 includes a metadata retriever 1512 and a dataset loader 1514. Note that not all steps of flowchart 1400 need be performed in all embodiments. Further structural and operational embodiments will be apparent to persons skilled in the relevant art(s) based on the following descriptions of FIGS. 14 and 15.

In the context of FIG. 15, library 1502 may provide a programming interface suitable for use within notebook experiences and scripts. As noted above, users, applications, and computing devices executing applications can benefit from the capabilities of library 1502 by leveraging a name resolution service (e.g., name resolution service 104) to identify data based on an aliased name. As shown in FIG. 15, name resolution service 104 is external to library 1502. Alternatively, library 1502 may include some or all of the logic necessary to perform functions of name resolution service 104.

Metadata retriever 1512 and dataset loader 1514 include logic and operations for loading a dataset into computer program 1506. For instance, metadata retriever 1512 may include logic and/or operations configured to perform the functions of metadata retriever 112 as described with respect to FIG. 1, resolution interface 202 as described with respect to FIGS. 2 and 4, and/or any other logic and/or operations for performing one or more steps of flowchart 1400 described below. Furthermore, dataset loader 1514 may include logic and/or operations configured to perform the functions of dataset loader 114 as described with respect to FIG. 1, data obtainer 204 and/or dataset generator 206 as described with respect to FIG. 2, load analyzer 1002 and/or data source selector 1004 as described with respect to FIG. 10, credential handler 1304 as described with respect to FIG. 13, and/or any other logic and/or operations for performing one or more steps of flowchart 1400 described below.

Computer program 1506 may comprise, for example, a notebook (e.g., a Spark notebook) or a script. Computer program 1506 may comprise a computer program that is under development (e.g., a notebook that a user intends to modify (e.g., utilizing user interface 1504)). Alternatively, computer program 1506 may comprise an already-developed computer program that is being accessed solely for the purpose of executing it (e.g., a notebook that a user wishes to execute (e.g., without modifying)).

Flowchart 1400 begins with step 1402. In step 1402, an application enables a library to be imported into a computer program under development. The library includes a metadata retriever and a dataset loader. For example, application 108 of FIG. 15 enables library 1502 to be imported into computer program 1506. For instance, through interaction with user interface 1504, a user may insert one or more commands into computer program 1506 that, when executed, cause library 1502 to be imported into computer program 1506. Alternatively, computer program 1506 may already include such command(s) at the time computer program 1506 is loaded by application 108. In another alternative, application 108 is configured to import library 1502 into computer program 1506.

In step 1404, the importing enables code of the library to be referenced within the computer program under development to cause the first call to be transmitted to the first name resolution service by the metadata retriever, the response to be received from the first name resolution service by the metadata retriever, to cause the data to be obtained from the data source by the dataset loader, and to cause the dataset to be generated by the dataset loader. For example, the importing in step 1402 enables code of library 1502 of FIG. 15 to be referenced within computer program 1506 to perform any of the steps of flowcharts 300, 400, 500, 700, 800, 900, 1100, and/or 1200, as described with respect to FIGS. 3, 4, 5, 7, 8, 9, 11, and 12, respectively. For instance, through interaction with user interface 1504, a user may reference code of library 1502 to perform any of the steps of flowcharts 300, 400, 500, 700, 800, 900, 1100, and/or 1200. Alternatively, application 108 may be configured to invoke operations of library 1502 to perform any of the steps of flowcharts 300, 400, 500, 700, 800, 900, 1100, and/or 1200. Furthermore, the importation of library 1502 into computer program 1506 may enable code of to perform functions of name resolution service 104 (e.g., as described with respect to FIGS. 16-21, as well as elsewhere herein).

By providing functions for retrieving metadata and loading datasets in a library, embodiments of system 1500 enable easy installation of metadata retriever 1512 and dataset loader 1514. For instance, the library may be installed using a package manager (e.g., Package Installer for Python (PIP) or Conda®) on a local workstation without depending on an external database infrastructure. In certain implementations, the library is compatible with applications that utilize notebooks (e.g., Jupyter® computing platform, Kaggle™ data science and machine learning platform, etc.).

VI. Example Name Resolution Service Embodiments

Figure 16:
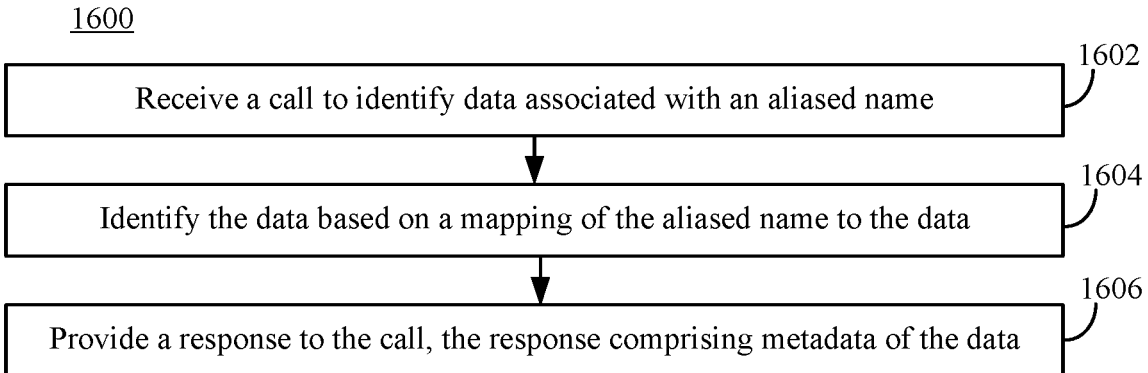
FIG. 16 shows a flowchart of a process for identifying data based on an aliased name, in accordance with an embodiment.
Figure 17:
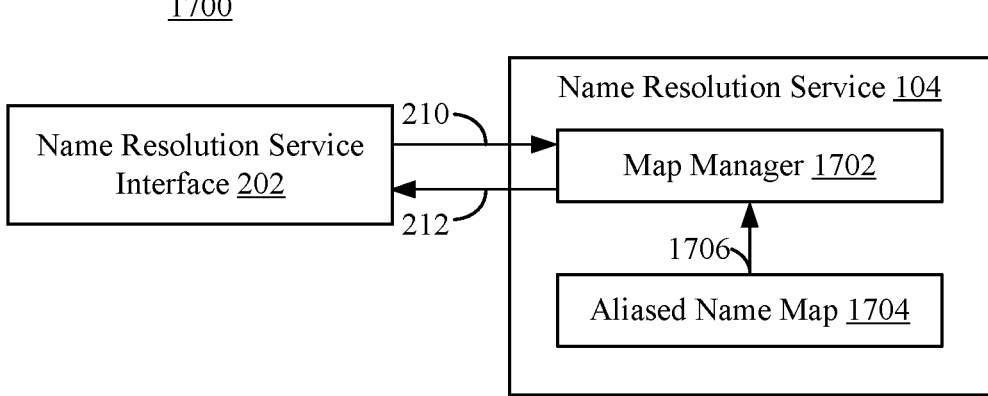
FIG. 17 shows a block diagram of the name resolution service of FIG. 1, in accordance with an embodiment.

Name resolution service 104 of FIG. 1 may operate to identify data based on an aliased name in various ways, in embodiments. For example, FIG. 16 shows a flowchart 1600 of a process for identifying data based on an aliased name, in accordance with an embodiment. Name resolution service 104 may operate according to flowchart 1600 in an embodiment. For purposes of illustration, flowchart 1600 is described with respect to FIG. 17. FIG. 17 shows a block diagram of a system 1700 comprising name resolution service 104 of FIG. 1, in accordance with an embodiment. As shown in FIG. 17, system 1700 comprises name resolution service 104 and name resolution service interface 202, as described with respect to FIGS. 1 and 2, respectively. As also shown in FIG. 17, name resolution service 104 comprises a map manager 1702 and an aliased name map 1704. Aliased name map 1704 in accordance with an embodiment is a map or table that stores a mapping of aliased names to respective data and associated metadata. In accordance with an alternative embodiment, aliased name map 1704 is a file (e.g., a feed source configuration file) that specifies a mapping of aliased names to respective data and associated metadata. Note that not all steps of flowchart 1600 need to be performed in all embodiments. Further structural and operational embodiments will be apparent to persons skilled in the relevant art(s) based on the following description of FIGS. 16 and 17.

Flowchart 1600 begins with step 1602. In step 1602, a call to identify data associated with an aliased name is received. For example, map manager 1702 of FIG. 17 receives call 210 from name resolution service interface 202. As described elsewhere herein, call 210 is a call to identify data associated with an aliased name.

In step 1604, the data is identified based on a mapping of the aliased name to the data. For example, map manager 1702 of FIG. 17 identifies the data based on a mapping of the aliased name to the data in aliased name map 1704. As shown in FIG. 17, map manager 1702 receives mapped data 1706 from aliased name map 1704. For instance, map manager 1702 may access aliased name map 1704 and utilize the aliased name to locate data (and metadata) mapped to the aliased name in aliased name map 1704. In this context, mapped data 1706 may include an identifier of the data and any metadata of the data, as described elsewhere herein.

In step 1606, a response to the call is provided. The response comprises metadata of the data. For example, map manager 1702 provides response 212 to name resolution service interface 202. Response 212 comprises the metadata included in mapped data 1706, as well as any other information associated with the identified data and/or call 210.

Map manager 1702 is configured to manage mappings of aliased names to data and associated metadata (e.g., stored in aliased name map 1704). For instance, as described with respect to flowchart 1600, map manager 1702 is configured to utilize aliased name map 1704 to identify data based on an aliased name. It is further contemplated herein that map manager 1702, in some embodiments, may be configured to update mappings of aliased names to data (e.g., by updating aliased name map 1704). Map manager 1702 may operate to update mappings of aliased names to data in various ways, in embodiments. For example, FIG. 18 shows a flowchart 1800 of a process for updating a mapping of an aliased name to data, in accordance with an embodiment. In accordance with an embodiment, map 1702 is configured to operate according to flowchart 1800. For purposes of illustration, flowchart 1800 is described with respect to FIG. 19A. FIG. 19A shows a block diagram of a system 1900A for updating a mapping of an aliased name to data, in accordance with an embodiment. As shown in FIG. 19A, system 1900A comprises name resolution service 104 (comprising map manager 1702 and aliased name 1704) as described with respect to FIG. 17 and publishing computing device 120 (comprising data management application 122) as described with respect to FIG. 1. Note that not all steps of flowchart 1800 need to be performed in all embodiments. Further structural and operational embodiments will be apparent to persons skilled in the relevant art(s) based on the following description of FIGS. 18 and 19A.

Flowchart 1800 begins with step 1802. In step 1802, an indication that data has been modified is received. For example, map manager 1702 of FIG. 19A receives, from data management application 122, an indication 1902 that data has been modified (e.g., by use or operation of data management application 122). Indication 1902 may indicate data has been moved from one data source to another, a format of the data has changed, an identifier of the data has changed, and/or any other metadata or other attribute of the data has been modified. In accordance with an embodiment, indication 1902 comprises instructions to update a mapping of the aliased name to the modified data. In accordance with an embodiment, indication 1902 specifies changes in the metadata of the modified data.

In step 1804, a mapping of an aliased name to the modified data is updated. For example, map manager 1702 of FIG. 19A updates the mapping of the aliased name in aliased name map 1704 via update signal 1904. Update signal 1904 causes aliased name map 1704 to update the mapping of the aliased name to the modified data. In accordance with an embodiment, update signal 1904 includes the changes specified by indication 1902. In some embodiments, and as shown in FIG. 19A, map manager 1702 provides an updated indication 1906 to data management application 122. In this context, updated indication 1906 indicates that aliased name map 1704 has been updated based on indication 1902.

Flowchart 1800 of FIG. 18 has been described with respect to a publishing entity (or an application on behalf of a publishing entity (e.g., data management application 122)) manually updating aliased name map 1704. In some embodiments, aliased name map 1704 is updated automatically (e.g., as data stored in a data source is updated, as a data source generates data, as a stream of data generated by a data source is modified, in response to receiving indications data stored in a data source is updated, on a periodic basis (e.g., at a predetermined time or every predetermined number of minutes, hours, days, weeks, etc.). FIG. 19B shows a block diagram of a system 1900B for updating a mapping of an aliased name to data, in accordance with another embodiment. As shown in FIG. 19B, system 1900B comprises name resolution service 104 (comprising map manager 1702 and aliased name map 1704) as described with respect to FIG. 17; data sources 106A-106*n* and publishing computing device 120 (comprising data management application 122) as described with respect to FIG. 1, and a cataloging service 1908. In accordance with an embodiment, cataloging service 1908 is a service executing on a computing device. In FIG. 19B, cataloging service 1908 is shown as separate from name resolution service 104 and publishing computing device 120. In an alternative embodiment, cataloging service 1908 and name resolution service 104 are implemented as a single service. In another alternative embodiment, cataloging service 1908 and name resolution service 104 are separate services executing on the same computing device. In another alternative embodiment, cataloging service 1908 and/or name resolution service 104 are services executing on publishing computing device 120. For instance, cataloging service 1908 may be a subservice of data management application 122, in an example embodiment.

Cataloging service 1908 is configured to monitor changes to data stored in and/or generated by data sources. As shown in FIG. 19B, cataloging service 1908 includes an update indicator 1910. Update indicator 1910 generates an indication if data (and associated metadata) monitored by cataloging service 1908 has changed. Cataloging service 1908 may generate indications in real time (or near real time) or on a periodic basis. For instance, as shown in FIG. 19B, cataloging service 1908 is configured to monitor data sources 106A-106*n* for changes in data stored in and/or generated by the data sources (e.g., data 116A-116*n*). As also shown in FIG. 19B, cataloging service 1908 receives data source information 1912A from data source 106A and data source information 1912*n* from data source 106*n*. Each of data source information 1912A-1912*n* may include a status of the respective data source, a storage capacity of the respective data source, an indication data was stored in and/or removed from the respective data source, details regarding the data stored in and/or removed from the respective data source, and/or any other information regarding the respective data source. In this context, update indicator 1910 is able to monitor changes in any of data sources 106A-106n.

In some embodiments, cataloging service 1908 also monitors operations performed by data management applications with respect to data sources 106A-106n. For example, as shown in FIG. 19B, cataloging service 1908 receives data management information 1914 from data management application 122. Data management information 1914 includes information regarding one or more data management operations performed by data management application 122 (e.g., modifying data stored in a data source, storing data in a data source, removing data from a data source, modifying a data source, and/or any other operation that may be performed by data management application 122 or by utilizing data management application 122). In this context, update indicator 1910 is able to monitor changes to data sources 106A-106n via operations performed by (or by utilizing) data management application 122.

If update indicator 1910 detects data has been modified (e.g., based on data source information 1912A-1912n and/or data management information 1914, and/or an analysis of data source information 1912A-1912n and/or data management information 1914), update indicator 1910 transmits an indication 1916 to map manager 1702. Indication 1916 may indicate data has been moved from one data source to another, a format of the data has changed, an identifier of the data has changed, and/or any other metadata or other attribute of the data has been modified. In accordance with an embodiment, indication 1916 comprises instructions to update a mapping of the aliased name to the modified data. In accordance with an embodiment, indication 1916 specifies changes in the metadata of the modified data.

In a similar manner as described with respect to step 1804 of flowchart 1800 of FIG. 18, map manager 1702 of FIG. 19B updates the mapping of the aliased name in aliased name map 1704 based on indication 1916. As shown in FIG. 19B, updates the mapping via update signal 1918. Update signal 1918 causes aliased name map 1704 to update the mapping of the aliased name to the modified data. In accordance with an embodiment, update signal 1918 includes the changes specified by indication 1916. In some embodiments, and as shown in FIG. 19B, map manager 1702 provides an updated indication 1920 to update indicator 1910. In this context, updated indication 1920 indicates that aliased name map 1704 has been updated based on indication 1916.

Figure 20:
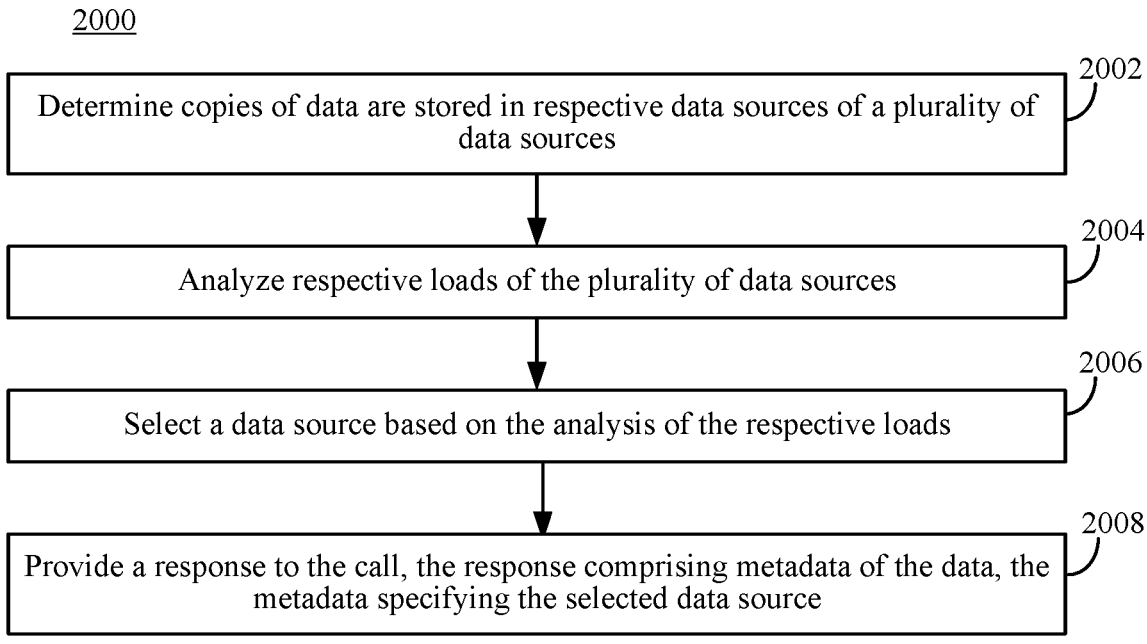
FIG. 20 shows a flowchart of a process for identifying data and performing load balancing, in accordance with an embodiment.
Figure 21:
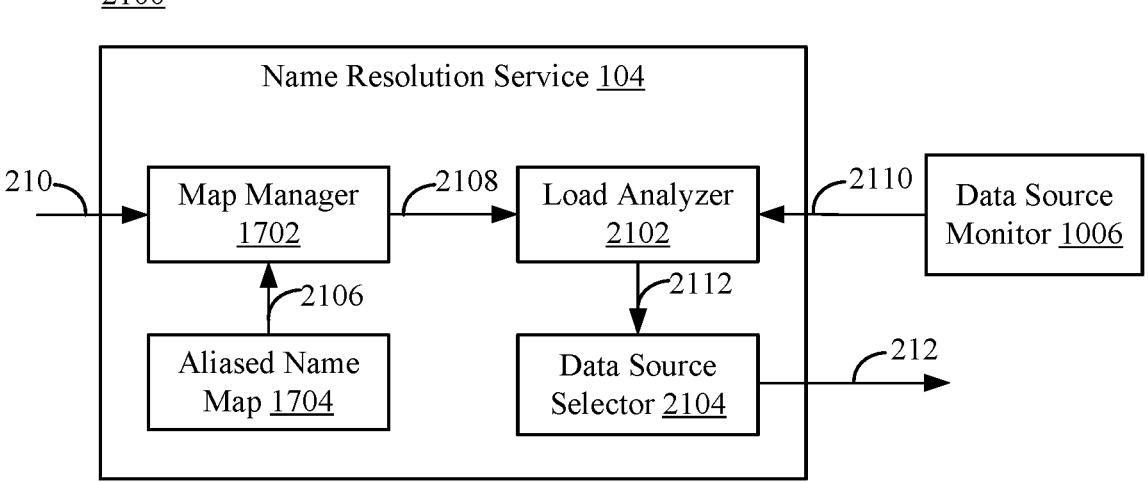
FIG. 21 shows a block diagram of a system for identifying data and performing load balancing, in accordance with an embodiment.

As discussed with respect to flowchart 900 of FIG. 9 and system 1000 of FIG. 10, data obtainer 204 may be configured to implement load balancing techniques. It is also contemplated herein that name resolution service 104 of FIG. 1 may be configured to implement load balancing techniques (in addition to or alternative to the techniques implemented by data obtainer 204, as described with respect to FIGS. 9 and 10). Name resolution service 104 may operate in various ways to implement load balancing techniques, in embodiments. For example, FIG. 20 shows a flowchart 2000 of a process for identifying data and performing load balancing, in accordance with an embodiment. Flowchart 2000 is a further embodiment of steps 1604 and 1606 of flowchart 1600, as described with respect to FIG. 16. Name resolution service 104 may be configured to operate according to flowchart 2000, in an embodiment. For purposes of illustration, flowchart 2000 is described with respect to FIG. 21. FIG. 21 shows a block diagram of a system 2100 for identifying data and performing load balancing, in accordance with an embodiment. As shown in FIG. 21, system 2100 comprises name resolution service 104 and data source monitor 1006, as each respectively described with respect to FIGS. 1 and 10. As also shown in FIG. 21, name resolution service 104 comprises map manager 1702 and aliased name map as described with respect to FIG. 17, a load analyzer 2102, and a data source selector 2104. Load analyzer 2102 and data source selector 2104 operate in a manner similar to load analyzer 1002 and data source selector 1004 of FIG. 10, and as further described with respect to the steps of flowchart 2000. Note that not all steps of flowchart 2000 need to be performed in all embodiments. Further structural and operational embodiments will be apparent to persons skilled in the relevant art(s) based on the following description of FIGS. 20 and 21.

Flowchart 2000 begins with step 2002, which is a further embodiment of step 1604 of flowchart 1600 of FIG. 16. In step 2002, a determination that copies of data are stored in and/or generated by respective data sources of a plurality of data sources is made. For example, map manager 1702 receives (or otherwise obtains) mapped data 2106 from aliased name map 1704. In this context, mapped data 2106 specifies that copies of the data (associated with the aliased name included in call 210) are stored in and/or generated by a plurality of respective data sources. Map manager 1702 determines from the metadata that multiple copies of the data are stored in and/or generated by multiple respective data sources and provides data source information 2108 to load analyzer 2102. In this context, data source information 2108 includes identifiers of the respective data sources.

In step 2004, respective loads of the plurality of data sources are analyzed. For example, load analyzer 2102 receives data source information 2108 and load information 2110. Depending on the implementation, load information 2110 comprises load information for all data sources monitored by data source monitor 1006 or for a subset of data sources monitored by data source monitor 1006. For instance, in accordance with an embodiment, load information 2110 comprises load information for the data sources identified in data source information 2108. As an example, load analyzer 2102 may transmit a request (not shown in FIG. 21) to data source monitor 1006 for the load information for the data sources identified in data source information 2108. In any of the aforementioned example embodiments (and/or with respect to other embodiment described elsewhere herein), load analyzer 2102 analyzes load information 2110 to determine the loads of the data sources. For instance, load analyzer 2102 may analyze load information 2110 to determine how often a particular data source is accessed in a period of time, how many applications and/or devices are accessing the particular data source, a latency of the data source's response to requests for data, a limit in the number of requests the data source can process within a period of time, a speed of a network used to access the data source, a capacity of a queue of requests for data of the data source, and/or any other data and/or information regarding the data source, usage of the data source, and/or a load of the data source. As shown in FIG. 21, load analyzer 2102 provides analysis result 2112 to data source selector 2104.

In step 2006, a data source is selected based on the analysis of the respective loads. For example, data source selector 2104 selects a data source from the data sources identified in data source information 2108. In accordance with an embodiment, data source selector 2104 selects the data source with the lightest load. In accordance with another embodiment, data source selector 2104 selects the data source with the lowest latency with respect to computing device 102. In accordance with another embodiment, data source selector 2104 selects a data source from a group of data sources that have relatively low loads (and/or low latencies) compared to other data sources identified in data source information 2108. In accordance with another embodiment, data source selector 2104 co-optimizes selecting the data source with the lightest load and lowest latency (e.g., by selecting a data source with a relatively low load and low latency (but not necessarily the lowest load or the lowest latency)).

In step 2008, a response is provided to the call. The response comprises metadata of the data, the metadata specifying the selected data source. For example, data source selector 2104 transmits response 212 to name resolution service interface 202 of FIG. 2 (e.g., in a similar manner as described with respect to step 1606 of flowchart 1600 of FIG. 16). In accordance with an embodiment, response 212 comprises metadata of the identified data, the metadata specifying the data source selected in step 2006.

By determining to access a data source based on an analysis of respective loads of a plurality of data sources, load analyzer 2102 and data source selector 2104 provide load balancing techniques (which distribute traffic to and from data sources (e.g., data sources 106A-106n)) to improve performance and availability of data, thereby reducing the latency in providing a response to a request to load data. Furthermore, load analyzer 2102 and data source selector 2104 provide the load balancing techniques in a manner that decouples the techniques from the consumer's code, enabling the consumer to implement simpler code without maintaining the overhead of load balancing. Further still, load analyzer 2102 and data source selector 2104 implement load balancing techniques that rely on metadata mapped to aliased names in aliased name map 1704, thereby enabling load analyzer 2102 and data source selector 2104 to select a data source based on an analysis of actual (or near actual) traffic conditions and data characteristics. Still further, by implementing load balancing techniques in name resolution service 104 (which may be remote to a consumer's computing device (e.g., computing device 102 of FIG. 1)), the computing resources of the consumer's computing device used to load data to a dataset are reduced. Moreover, by implementing load balancing techniques, load analyzer 2102 and data source selector 2104 improve the scalability of systems that utilize data bridges. For instance, as more users utilize a data processing system, the overall traffic in the data processing system increases. The load balancing techniques of load analyzer 2102 and data selector 2104 described with respect to FIGS. 20 and 21 (as well as elsewhere herein) enable a consumer to leverage data distributed across multiple locations, potentially reducing traffic to a particular data source, and thereby reducing the latency in generating datasets.

Furthermore, by implementing load balancing techniques in subservices of name resolution service 104, load analyzer 2102 and data source selector 2104 can return different physical paths for different consumers that transmit calls to identify the same data (or data stored and/or generated by the same data source) to name resolution service 104. Load analyzer 2102 and/or data source selector 2104 may utilize various algorithms or policies to determine the best physical path for each consumer, based on the current (or near current) traffic conditions, or other data characteristics. In this manner, the distribution of the load across data sources is improved. Furthermore, the load may be dynamically adjusted as traffic demand and/or data changes.

VII. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 22:
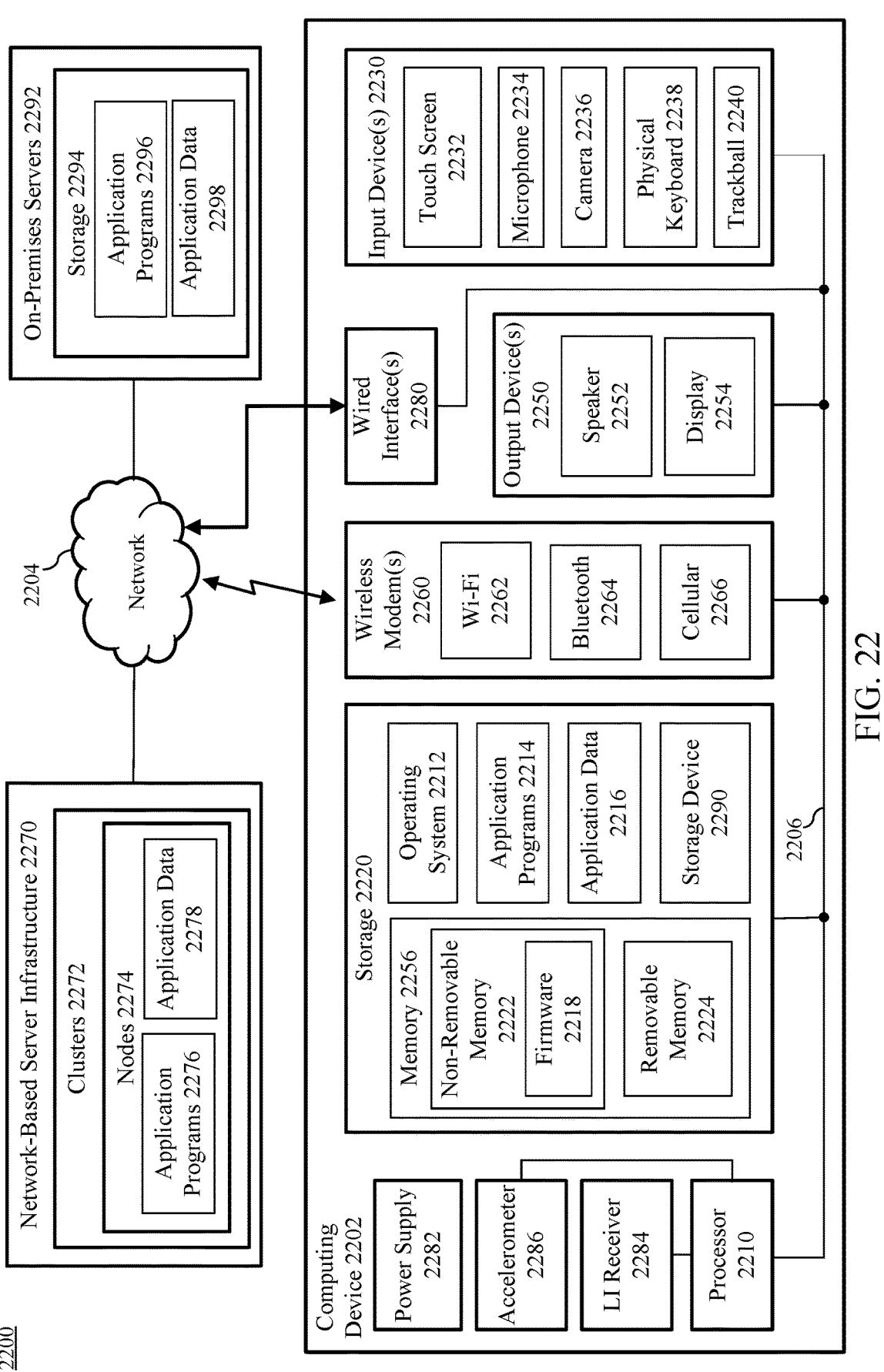
FIG. 22 shows a block diagram of an example computing system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 22. FIG. 22 shows a block diagram of an exemplary computing environment 2200 that includes a computing device 2202. Computing device 2202 is an example of computing device 102 and/or publishing computing device 120 of FIG. 1, system 200 of FIG. 2, system 600 of FIG. 6, system 1000 and/or data source monitor 1006 of FIG. 10, system 1300 of FIG. 13, system 1500 of FIG. 15, system 1700 of FIG. 17, system 1900A of FIG. 19A, system 1900B of FIG. 19B, and/or system 2100 of FIG. 21, each of which may include one or more of the components of computing device 2202. In some embodiments, computing device 2202 is communicatively coupled with devices (not shown in FIG. 22) external to computing environment 2200 via network 2204. Network 2204 is an example of network 118 of FIG. 1 and comprises one or more networks such as local area networks (LANs), wide area networks (WANs), enterprise networks, the Internet, etc., and may include one or more wired and/or wireless portions. Network 2204 may additionally or alternatively include a cellular network for cellular communications. Computing device 2202 is described in detail as follows.

Computing device 2202 can be any of a variety of types of computing devices. For example, computing device 2202 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 2202 may alternatively be a stationary computing device such as a desktop computer, a personal computer (PC), a stationary server device, a minicomputer, a mainframe, a supercomputer, etc.

As shown in FIG. 22, computing device 2202 includes a variety of hardware and software components, including a processor 2210, a storage 2220, one or more input devices 2230, one or more output devices 2250, one or more wireless modems 2260, one or more wired interfaces 2280, a power supply 2282, a location information (LI) receiver 2284, and an accelerometer 2286. Storage 2220 includes memory 2256, which includes non-removable memory 2222 and removable memory 2224, and a storage device 2290. Storage 2220 also stores an operating system 2212, application programs 2214, and application data 2216. Wireless modem(s) 2260 include a Wi-Fi modem 2262, a Bluetooth modem 2264, and a cellular modem 2266. Output device(s) 2250 includes a speaker 2252 and a display 2254. Input device(s) 2230 includes a touch screen 2232, a microphone 2234, a camera 2236, a physical keyboard 2238, and a trackball 2240. Not all components of computing device 2202 shown in FIG. 22 are present in all embodiments, additional components not shown may be present, and any combination of the components may be present in a particular embodiment. These components of computing device 2202 are described as follows.

A single processor 2210 (e.g., central processing unit (CPU), microcontroller, a microprocessor, signal processor, ASIC (application specific integrated circuit), and/or other physical hardware processor circuit) or multiple processors 2210 may be present in computing device 1002 for performing such tasks as program execution, signal coding, data processing, input/output processing, power control, and/or other functions. Processor 2210 may be a single-core or multi-core processor, and each processor core may be single-threaded or multithreaded (to provide multiple threads of execution concurrently). Processor 2210 is configured to execute program code stored in a computer readable medium, such as program code of operating system 2212 and application programs 2214 stored in storage 2220. Operating system 2212 controls the allocation and usage of the components of computing device 2202 and provides support for one or more application programs 2214 (also referred to as "applications" or "apps"). Application programs 2214 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 2202 can communicate with any other component according to function, although not all connections are shown for case of illustration. For instance, as shown in FIG. 22, bus 2206 is a multiple signal line communication medium (e.g., conductive traces in silicon, metal traces along a motherboard, wires, etc.) that may be present to communicatively couple processor 2210 to various other components of computing device 2202, although in other embodiments, an alternative bus, further buses, and/or one or more individual signal lines may be present to communicatively couple components. Bus 2206 represents one or more of any of several types of bus structures, including a memory bus or memory controller, a peripheral bus, an accelerated graphics port, and a processor or local bus using any of a variety of bus architectures.

Storage 2220 is physical storage that includes one or both of memory 2256 and storage device 2290, which store operating system 2212, application programs 2214, and application data 2216 according to any distribution. Non-removable memory 2222 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 2222 may include main memory and may be separate from or fabricated in a same integrated circuit as processor 2210. As shown in FIG. 22, non-removable memory 2222 stores firmware 2218, which may be present to provide low-level control of hardware. Examples of firmware 2218 include BIOS (Basic Input/Output System, such as on personal computers) and boot firmware (e.g., on smart phones). Removable memory 2224 may be inserted into a receptacle of or otherwise coupled to computing device 2202 and can be removed by a user from computing device 2202. Removable memory 2224 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 2290 may be present that are internal and/or external to a housing of computing device 2202 and may or may not be removable. Examples of storage device 2290 include a hard disk drive, a SSD, a thumb drive (e.g., a USB (Universal Serial Bus) flash drive), or other physical storage device.

One or more programs may be stored in storage 2220. Such programs include operating system 2212, one or more application programs 2214, and other program modules and program data. Examples of such application programs may include, for example, computer program logic (e.g., computer program code/instructions) for implementing one or more of name resolution service 104, data source 106A, data source 106n, application 108, data bridge 110, metadata retriever 112, data loader 114, data management application 122, name resolution service interface 202, data obtainer 204, dataset generator 206, name resolution service 604A, name resolution service 604B, name resolution service 604n, load analyzer 1002, data source selector 1004, data source monitor 1006, configuration store 1302, credential handler 1304, credential service 1306, library 1502, user interface 1504, computer program 1506, metadata retriever 1512, dataset loader 1514, map manager 1702, aliased name map 1704, cataloging service 1908, update indicator 1910, load analyzer 2102 and/or data source selector 2104, along with any components and/or subcomponents thereof, as well as the flowcharts/flow diagrams (e.g., flowcharts 300, 400, 500, 700, 800, 900, 1100, 1200, 1400, 1600, 1800, and/or 2000) described herein, including portions thereof, and/or further examples described herein.

Storage 2220 also stores data used and/or generated by operating system 2212 and application programs 2214 as application data 2216. Examples of application data 2216 include web pages, text, images, tables, sound files, video data, and other data, which may also be sent to and/or received from one or more network servers or other devices via one or more wired or wireless networks. Storage 2220 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 2202 through one or more input devices 2230 and may receive information from computing device 1002 through one or more output devices 2250. Input device(s) 2230 may include one or more of touch screen 2232, microphone 2234, camera 2236, physical keyboard 2238 and/or trackball 2240 and output device(s) 2250 may include one or more of speaker 2252 and display 2254. Each of input device(s) 2230 and output device(s) 2250 may be integral to computing device 2202 (e.g., built into a housing of computing device 2202) or external to computing device 2202 (e.g., communicatively coupled wired or wirelessly to computing device 2202 via wired interface(s) 2280 and/or wireless modem(s) 2260). Further input devices 2230 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 2254 may display information, as well as operating as touch screen 2232 by receiving user commands and/or other information (e.g., by touch, finger gestures, virtual keyboard, etc.) as a user interface. Any number of each type of input device(s) 2230 and output device(s) 2250 may be present, including multiple microphones 2234, multiple cameras 2236, multiple speakers 2252, and/or multiple displays 2254.

One or more wireless modems 2260 can be coupled to antenna(s) (not shown) of computing device 2202 and can support two-way communications between processor 2210 and devices external to computing device 2202 through network 2204, as would be understood to persons skilled in the relevant art(s). Wireless modem 2260 is shown generically and can include a cellular modem 2266 for communicating with one or more cellular networks, such as a GSM network for data and voice communications within a single cellular network, between cellular networks, or between the mobile device and a public switched telephone network (PSTN). Wireless modem 2260 may also or alternatively include other radio-based modem types, such as a Bluetooth modem 2264 (also referred to as a "Bluetooth device") and/or Wi-Fi 2262 modem (also referred to as an "wireless adaptor"). Wi-Fi modem 2262 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 2264 is configured to communicate with another Bluetooth-capable device according to the Bluetooth short-range wireless technology standard(s) such as IEEE 802.15.1 and/or managed by the Bluetooth Special Interest Group (SIG).

Computing device 2202 can further include power supply 2282, LI receiver 2284, accelerometer 2286, and/or one or more wired interfaces 2280. Example wired interfaces 2280 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 2280 of computing device 2202 provide for wired connections between computing device 2202 and network 2204, or between computing device 2202 and one or more devices/peripherals when such devices/peripherals are external to computing device 2202 (e.g., a pointing device, display 2254, speaker 2252, camera 2236, physical keyboard 2238, etc.). Power supply 2282 is configured to supply power to each of the components of computing device 2202 and may receive power from a battery internal to computing device 2202, and/or from a power cord plugged into a power port of computing device 2202 (e.g., a USB port, an A/C power port). LI receiver 2284 may be used for location determination of computing device 2202 and may include a satellite navigation receiver such as a Global Positioning System (GPS) receiver or may include other type of location determiner configured to determine location of computing device 2202 based on received information (e.g., using cell tower triangulation, etc.). Accelerometer 1086 may be present to determine an orientation of computing device 2202.

Note that the illustrated components of computing device 2202 are not required or all-inclusive, and fewer or greater numbers of components may be present as would be recognized by one skilled in the art. For example, computing device 2202 may also include one or more of a gyroscope, barometer, proximity sensor, ambient light sensor, digital compass, etc. Processor 2210 and memory 2256 may be co-located in a same semiconductor device package, such as being included together in an integrated circuit chip, FPGA, or system-on-chip (SOC), optionally along with further components of computing device 2202.

In embodiments, computing device 2202 is configured to implement any of the above-described features of flowcharts herein. Computer program logic for performing any of the operations, steps, and/or functions described herein may be stored in storage 2220 and executed by processor 2210.

In some embodiments, server infrastructure 2270 may be present in computing environment 2200 and may be communicatively coupled with computing device 2202 via network 2204. Server infrastructure 2270, when present, may be a network-accessible server set (e.g., a cloud computing platform). As shown in FIG. 22, server infrastructure 2270 includes clusters 2272. Each of clusters 2272 may comprise a group of one or more compute nodes and/or a group of one or more storage nodes. For example, as shown in FIG. 22, cluster 2272 includes nodes 2274. Each of nodes 2274 is accessible via network 2204 (e.g., in a "cloud computing platform" or "cloud-based" embodiment) to build, deploy, and manage applications and services. Any of nodes 2274 may be a storage node that comprises a plurality of physical storage disks, SSDs, and/or other physical storage devices that are accessible via network 2204 and are configured to store data associated with the applications and services managed by nodes 2274. For example, as shown in FIG. 22, nodes 2274 may store application data 2278.

Each of nodes 2274 may, as a compute node, comprise one or more server computers, server systems, and/or computing devices. For instance, a node 2274 may include one or more of the components of computing device 2202 disclosed herein. Each of nodes 2274 may be configured to execute one or more software applications (or "applications") and/or services and/or manage hardware resources (e.g., processors, memory, etc.), which may be utilized by users (e.g., customers) of the network-accessible server set. For example, as shown in FIG. 22, nodes 2274 may operate application programs 2276. In an implementation, a node of nodes 2274 may operate or comprise one or more virtual machines, with each virtual machine emulating a system architecture (e.g., an operating system), in an isolated manner, upon which applications such as application programs 2276 may be executed.

In an embodiment, one or more of clusters 2272 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 2272 may be a datacenter in a distributed collection of datacenters. In embodiments, exemplary computing environment 2200 comprises part of a cloud-based platform such as Amazon Web Services® of Amazon Web Services, Inc., or Google Cloud Platform™ of Google LLC, although these are only examples and are not intended to be limiting.

In an embodiment, computing device 2202 may access application programs 2276 for execution in any manner, such as by a client application and/or a browser at computing device 2202. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 2202 may additionally and/or alternatively synchronize copies of application programs 2214 and/or application data 2216 to be stored at network-based server infrastructure 2270 as application programs 2276 and/or application data 2278. For instance, operating system 2212 and/or application programs 2214 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 2220 at network-based server infrastructure 2270.

In some embodiments, on-premises servers 2292 may be present in computing environment 2200 and may be communicatively coupled with computing device 2202 via network 2204. On-premises servers 2292, when present, are hosted within an organization's infrastructure and, in many cases, physically onsite of a facility of that organization. On-premises servers 2292 are controlled, administered, and maintained by IT (Information Technology) personnel of the organization or an IT partner to the organization. Application data 2298 may be shared by on-premises servers 2292 between computing devices of the organization, including computing device 2202 (when part of an organization) through a local network of the organization, and/or through further networks accessible to the organization (including the Internet). Furthermore, on-premises servers 2292 may serve applications such as application programs 2296 to the computing devices of the organization, including computing device 2202. Accordingly, on-premises servers 2292 may include storage 2294 (which includes one or more physical storage devices such as storage disks and/or SSDs) for storage of application programs 1096 and application data 2298 and may include one or more processors for execution of application programs 2296. Still further, computing device 2202 may be configured to synchronize copies of application programs 2214 and/or application data 2216 for backup storage at on-premises servers 2292 as application programs 2296 and/or application data 2298.

Embodiments described herein may be implemented in one or more of computing device 2202, network-based server infrastructure 2270, and on-premises servers 2292. For example, in some embodiments, computing device 2202 may be used to implement systems, clients, or devices, or components/subcomponents thereof, disclosed elsewhere herein. In other embodiments, a combination of computing device 2202, network-based server infrastructure 2270, and/or on-premises servers 2292 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 2220. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 2214) may be stored in storage 2220. Such computer programs may also be received via wired interface(s) 2280 and/or wireless modem(s) 2260 over network 2204. Such computer programs, when executed or loaded by an application, enable computing device 2202 to implement features of embodiments discussed herein. Accordingly, such computer programs represent controllers of the computing device 2202.

Embodiments are also directed to computer program products comprising computer code or instructions stored on any computer-readable medium or computer-readable storage medium. Such computer program products include the physical storage of storage 2220 as well as further physical storage types.

VIII. Additional Exemplary Embodiments

A system is described herein. The system comprises a processor circuit and memory. The memory stores program code executable by the processor circuit. The program code comprises a metadata retriever and a dataset loader. The metadata retriever is configured to: receive a request to load data, the request comprising an aliased name associated with the data, transmit, to a first name resolution service executing on a computing device, a first call comprising the aliased name, the first call configured to cause the first name resolution service to identify the data associated with the aliased name, and receive, from the first name resolution service, a response comprising metadata of the data. The dataset loader is configured to: obtain the data from a data source based on the metadata, generate a dataset based on the obtained data, and provide a response to the request, the response comprising the generated dataset.

In an implementation of the foregoing system, the metadata specifies the data source in which the data is stored. To obtain the data from the data source, the dataset loader is further configured to access the data source specified by the metadata to obtain the data.

In an implementation of the foregoing system, the metadata specifies a format of the data. To generate the dataset, the dataset loader is further configured to transform the format of the data from a first format type to a dataset format type.

In an implementation of the foregoing system, the metadata specifies a plurality of data sources that store the data. The plurality of data sources comprises the data source. To obtain the data from the data source the dataset loader is further configured to determine to access the data source based on an analysis of respective loads of the plurality of data sources.

In an implementation of the foregoing system, the metadata specifies a requirement for a user credential to access the data. The dataset loader is further configured to: receive the user credential and utilize the user credential to obtain the data from the data source.

In an implementation of the foregoing system, to receive the user credential, the dataset loader is further configured to: identify a credential service based on the requirement specified by the metadata, the credential service configured to maintain the user credential; and obtain the user credential from the credential service.

In an implementation of the foregoing system, to transmit the first call comprising the aliased name, the metadata retriever is further configured to transmit, to a plurality of name resolution services comprising the first name resolution service, respective calls comprising the aliased name.

In an implementation of the foregoing system, to transmit respective calls comprising the aliased name, the metadata retriever is further configured to: prior to the transmission of the first call, transmit, to a second name resolution service of the plurality of name resolution services, a second call comprising the aliased name, the second call configured to cause the second name resolution service to attempt to identify the data associated with the aliased name; and receive, from second name resolution service, a response indicating the second name resolution service failed to identify the data; and transmit, to the first name resolution service, the first call.

In an implementation of the foregoing system, the system enables a library to be imported into a computer program under development. The library comprises a metadata retriever and a dataset generator. Based on the importation of the library, the system enables code of the library to be referenced within the computer program under development to cause the metadata retriever to transmit the first call to the first name resolution service and receive the response from the first name resolution service, and to cause the dataset generator to obtain the data from the data source and generate the dataset.

A method is described here. The method comprises: receiving a request to load data, the request comprising an aliased name associated with the data; transmitting, to a first name resolution service executing on a computing device, a first call comprising the aliased name, the first call configured to cause the first name resolution service to identify the data associated with the aliased name; and receiving, from the first name resolution service, a response comprising metadata of the data; obtaining the data from a data source based on the metadata; generating a dataset based on the obtained data; and providing a response to the request, the response comprising the generated dataset.

In an implementation of the foregoing method, the metadata specifies the data source in which the data is stored and said obtaining the data from the data source comprises accessing the data source specified by the metadata to obtain the data.

In an implementation of the foregoing method, the metadata specifies a format of the data and said generating the dataset comprises transforming the format of the data from a first format type to a dataset format type.

In an implementation of the foregoing method, the metadata specifies a plurality of data sources that store the data, the plurality of data sources comprising the data source, and said obtaining the data from the data source comprises determining to access the data source based on an analysis of respective loads of the plurality of data sources.

In an implementation of the foregoing method, the metadata specifies a requirement for a user credential to access the data, and the method further comprises: receiving the user credential; and utilizing the user credential to obtain the data from the data source.

In an implementation of the foregoing method, said receiving the user credential comprises: identifying a credential service based on the requirement specified by the metadata, the credential service configured to maintain the user credential; and obtaining the user credential from the credential service.

In an implementation of the foregoing method, said transmitting the first call comprising the aliased name comprises: transmitting, to a plurality of name resolution services comprising the first name resolution service, respective calls comprising the aliased name.

In an implementation of the foregoing method, said transmitting respective calls comprising the aliased name comprises: prior to transmitting the first call, transmitting, to a second name resolution service of the plurality of name resolution services, a second call comprising the aliased name, the second call configured to cause the second name resolution service to attempt to identify the data associated with the aliased name; and receiving, from the second name resolution service, a response indicating the second name resolution service failed to identify the data; and transmitting, to the first name resolution service, the first call.

In an implementation of the foregoing method, the name resolution service is updated by an entity that produces the data.

In an implementation of the foregoing method, the name resolution service is automatically updated by a cataloging service that monitors changes to the data.

In an implementation of the foregoing method, the method further comprises: enabling a library to be imported into a computer program under development, the library including a metadata retriever and a dataset generator; and based on the importing, enabling code of the library to be referenced within the computer program under development to cause the metadata retriever to transmit the first call to the first name resolution service and receive the response from the first name resolution service, and to cause the dataset generator to obtain the data from the data source and generate the dataset.

A computer-readable storage medium is described herein. The computer-readable storage medium is encoded with program instructions that, when executed by a processor circuit, perform a method. The method comprises: receiving a request to load data, the request comprising an aliased name associated with the data; transmitting, to a first name resolution service executing on a computing device, a first call comprising the aliased name, the first call configured to cause the first name resolution service to identify the data associated with the aliased name; receiving, from the first name resolution service, a response comprising metadata of the data; obtaining the data from a data source based on the metadata; generating a dataset based on the obtained data; and providing a response to the request, the response comprising the generated dataset.

In an implementation of the foregoing computer-readable storage medium, the metadata specifies the data source in which the data is stored and said obtaining the data from the data source comprises accessing the data source specified by the metadata to obtain the data.

In an implementation of the foregoing computer-readable storage medium, the metadata specifies a format of the data and said generating the dataset comprises transforming the format of the data from a first format type to a dataset format type.

In an implementation of the foregoing computer-readable storage medium, the metadata specifies a plurality of data sources that store the data, the plurality of data sources comprising the data source, and said obtaining the data from the data source comprises determining to access the data source based on an analysis of respective loads of the plurality of data sources.

In an implementation of the foregoing computer-readable storage medium, the metadata specifies a requirement for a user credential to access the data, and the method further comprises: receiving the user credential; and utilizing the user credential to obtain the data from the data source.

In an implementation of the foregoing computer-readable storage medium, said receiving the user credential comprises: identifying a credential service based on the requirement specified by the metadata, the credential service configured to maintain the user credential; and obtaining the user credential from the credential service.

In an implementation of the foregoing computer-readable storage medium, said transmitting the first call comprising the aliased name comprises: transmitting, to a plurality of name resolution services comprising the first name resolution service, respective calls comprising the aliased name.

In an implementation of the foregoing computer-readable storage medium, said transmitting respective calls comprising the aliased name comprises: prior to transmitting the first call, transmitting, to a second name resolution service of the plurality of name resolution services, a second call comprising the aliased name, the second call configured to cause the second name resolution service to attempt to identify the data associated with the aliased name; receiving, from second name resolution service, a response indicating the second name resolution service failed to identify the data; and transmitting, to the first name resolution service, the first call.

In an implementation of the foregoing computer-readable storage medium, the name resolution service is updated by an entity that produces the data.

In an implementation of the foregoing computer-readable storage medium, the name resolution service is automatically updated by a cataloging service that monitors changes to the data.

In an implementation of the foregoing computer-readable storage medium, the method further comprises: enabling a library to be imported into a computer program under development, the library including a metadata retriever and a dataset generator; and based on the importing, enabling code of the library to be referenced within the computer program under development to cause the metadata retriever to transmit the first call to the first name resolution service and receive the response from the first name resolution service, and to cause the dataset generator to obtain the data from the data source and generate the dataset.

IX. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, name resolution services, data sources, publishing computing devices, data bridges, credential services, configuration stores, data source monitors, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:

a processor circuit; and memory that stores program code executable by the processor circuit, the program code comprising:

a metadata retriever configured to:

receive a request to load data, the request comprising an aliased name associated with the data, transmit, to a first name resolution service executing on a computing device, a first call comprising the aliased name, the first call configured to cause the first name resolution service to attempt to identify the data associated with the aliased name, receive, from the first name resolution service, a response indicating the first name resolution service failed to identify the data, transmit, to a second name resolution service, a second call comprising the aliased name, the second call configured to cause the second name service to attempt to identify the data associated with the aliased name, and receive, from the second name resolution service, a response comprising metadata of the data; and a dataset loader configured to:

obtain the data from a data source based on the metadata, generate a dataset based on the obtained data, and provide a response to the request, the response comprising the generated dataset.

2. The system of claim 1, wherein the metadata specifies the data source in which the data is stored, and to obtain the data from the data source the dataset loader is further configured to:

access the data source specified by the metadata to obtain the data.

3. The system of claim 1, wherein the metadata specifies a format of the data, and to generate the dataset the dataset loader is further configured to:

transform the format of the data from a first format type to a dataset format type.

4. The system of claim 1, wherein the metadata specifies a plurality of data sources that store the data, the plurality of data sources comprising the data source, and to obtain the data from the data source the dataset loader is further configured to:

determine to access the data source based on an analysis of respective loads of the plurality of data sources.

5. The system of claim 1, wherein the metadata specifies a requirement for a user credential to access the data, and the dataset loader is further configured to:

receive the user credential; and utilize the user credential to obtain the data from the data source.

6. The system of claim 5, wherein to receive the user credential, the dataset loader is further configured to:

identify a credential service based on the requirement specified by the metadata, the credential service configured to maintain the user credential; and obtain the user credential from the credential service.

7. The system of claim 1, further comprising:

enabling a library to be imported into a computer program under development, the library including a metadata retriever and a dataset generator; and based on the importing, enabling code of the library to be referenced within the computer program under development to cause the metadata retriever to transmit the first call to the first name resolution service and receive the response from the first name resolution service, and to cause the dataset generator to obtain the data from the data source and generate the dataset.

8. A method, comprising, receiving a request to load data, the request comprising an aliased name associated with the data;

transmitting, to a plurality of name resolution services comprising a first name resolution service and a second resolution service, respective calls comprising the aliased name by:

transmitting, to the first name resolution service executing on a computing device, a first call comprising the aliased name, the first call configured to cause the first name resolution service to attempt to identify the data associated with the aliased name, receiving, from the first name resolution service, a response indicating the first name resolution service failed to identify the data, and transmitting, to the second name resolution service, a second call comprising the aliased name, the second call configured to cause the second name resolution service to attempt to identify the data;

receiving, from the second name resolution service, a response comprising metadata of the data;

obtaining the data from a data source based on the metadata;

generating a dataset based on the obtained data; and providing a response to the request, the response comprising the generated dataset.

9. The method of claim 8, wherein the metadata specifies the data source in which the data is stored and said obtaining the data from the data source comprises:

accessing the data source specified by the metadata to obtain the data.

10. The method of claim 8, wherein the metadata specifies a format of the data and said generating the dataset comprises:

transforming the format of the data from a first format type to a dataset format type.

11. The method of claim 8, wherein the metadata specifies a plurality of data sources that store the data, the plurality of data sources comprising the data source, and said obtaining the data from the data source comprises:

determining to access the data source based on an analysis of respective loads of the plurality of data sources.

12. The method of claim 8, wherein the metadata specifies a requirement for a user credential to access the data, and the method further comprises:

receiving the user credential; and utilizing the user credential to obtain the data from the data source.

13. The method of claim 12, wherein said receiving the user credential comprises:

identifying a credential service based on the requirement specified by the metadata, the credential service configured to maintain the user credential; and obtaining the user credential from the credential service.

14. The method of claim 8, wherein the second name resolution service is updated by an entity that produces the data.

15. The method of claim 8, wherein the second name resolution service is automatically updated by a cataloging service that monitors changes to the data.

16. The method of claim 8, further comprising:

enabling a library to be imported into a computer program under development, the library including a metadata retriever and a dataset generator; and based on the importing, enabling code of the library to be referenced within the computer program under development to cause the metadata retriever to transmit the first call to the first name resolution service and receive the response from the first name resolution service, and to cause the dataset generator to obtain the data from the data source and generate the dataset.

17. A computer-readable storage medium encoded with program instructions that, when executed by a processor circuit, perform a method comprising:

enabling a library to be imported into a computer program under development, the library comprising a metadata retriever and a dataset generator; and based on the importing, enabling code of the library to be referenced within the computer program under development to:

cause the metadata retriever to:

receive a request to load data, the request comprising an aliased name associated with the data, transmit, to a first name resolution service executing on a computing device, a first call comprising the aliased name, the first call configured to cause the first name resolution service to identify the data associated with the aliased name, and receive, from the first name resolution service, a response comprising metadata of the data; and cause the dataset generator to:

obtain the data from a data source based on the metadata, generate a dataset based on the obtained data, and provide a response to the request, the response comprising the generated dataset.

18. The computer-readable storage medium of claim 17, wherein said enabling the code of the library to be referenced within the computer program under development to cause the metadata retriever to transmit the first call comprises:

enabling the code of the library to be referenced within the computer program under development to cause the metadata retriever to transmit, to a plurality of name resolution services comprising the first name resolution service, respective calls comprising the aliased name, the respective calls comprising the first call.

19. The computer-readable storage medium of claim 18, wherein said enabling the code of the library to be referenced within the computer program under development to cause the metadata retriever to transmit the respective calls comprises:

enabling the code of the library to be referenced within the computer program under development to cause the metadata retriever to simultaneously transmit the first call to the first name resolution service and a second call to a second name resolution service.

20. The computer-readable storage medium of claim 18, wherein said enabling the code of the library to be referenced within the computer program under development to cause the metadata retriever to transmit the respective calls comprises:

enabling the code of the library to be referenced within the computer program under development to cause the metadata retriever to, prior to transmitting the first call:

transmit, to a second name resolution service of the plurality of name resolution services, a second call comprising the aliased name, the second call configured to cause the second name resolution service to attempt to identify the data associated with the aliased name, and receive, from the second name resolution service, a response indicating the second name resolution service failed to identify the data.

* * * * *